US009948206B2

(12) United States Patent
Hasegawa et al.

(10) Patent No.: US 9,948,206 B2
(45) Date of Patent: Apr. 17, 2018

(54) MULTILEVEL POWER CONVERSION DEVICE WITH FLYING CAPACITOR

(71) Applicant: MEIDENSHA CORPORATION, Tokyo (JP)

(72) Inventors: Isamu Hasegawa, Numazu (JP); Takashi Kodama, Numazu (JP); Takeshi Kondo, Mishima (JP); Shota Urushibata, Odawara (JP); Hiromi Sako, Numazu (JP); Kenji Kobori, Shizuoka (JP); Shizunori Hamada, Numazu (JP); Keiichi Kodachi, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 14/908,884

(22) PCT Filed: May 28, 2014

(86) PCT No.: PCT/JP2014/064105
§ 371 (c)(1),
(2) Date: Jan. 29, 2016

(87) PCT Pub. No.: WO2015/015885
PCT Pub. Date: Feb. 5, 2015

(65) Prior Publication Data

US 2016/0181949 A1 Jun. 23, 2016

(30) Foreign Application Priority Data

Aug. 2, 2013 (JP) ................................ 2013-160999
Nov. 21, 2013 (JP) ................................ 2013-240681

(51) Int. Cl.
*H02M 7/537* (2006.01)
*H02M 7/483* (2007.01)
*H02M 7/487* (2007.01)

(52) U.S. Cl.
CPC ........... *H02M 7/537* (2013.01); *H02M 7/483* (2013.01); *H02M 7/487* (2013.01)

(58) Field of Classification Search
CPC ........ H02M 7/537; H02M 7/483; H02M 7/44; H02M 7/217; H02M 7/49; H02M 2001/007
See application file for complete search history.

(56) References Cited

U.S. PATENT DOCUMENTS 8,649,187 B2 * 2/2014 Aiello .................. H02M 7/483 363/131
9,214,878 B2 12/2015 Takizawa
(Continued)

FOREIGN PATENT DOCUMENTS

JP 2005-168240 A 6/2005
JP 2006-87257 A 3/2006
(Continued)

OTHER PUBLICATIONS

Alian Chen et al., A Novel Type of Combined Multilevel Converter Topologies, 30th Annual Conference of the IEEE Industrial Electronics Society, Nov. 2, 2004, pp. 2290-2294.
(Continued)

*Primary Examiner* — Yusef Ahmed
(74) *Attorney, Agent, or Firm* — Foley & Lardner LLP

(57) ABSTRACT

A multilevel power conversion device includes: N (N≥1) direct current voltage sources; a first flying capacitor; a second flying capacitor; and a phase module of a M phase (M≥2) being configured to output, from the output terminal, a potential of one of the input terminals, or a potential
(Continued)

obtained by adding or subtracting the voltage of the capacitor to or from the potential of the one of the input terminals, by selectively controlling the respective switching elements in an ON/OFF manner.

5 Claims, 31 Drawing Sheets

(56) References Cited

U.S. PATENT DOCUMENTS

| | | | | |
|---|---|---|---|---|
| 9,413,221 | B1 * | 8/2016 | Kim | H02M 1/32 |
| 2008/0198630 | A1 * | 8/2008 | Hiller | H02M 7/217 363/13 |
| 2012/0092915 | A1 * | 4/2012 | Okuda | H02M 7/487 363/132 |
| 2013/0258728 | A1 * | 10/2013 | Takizawa | H02H 7/1203 363/50 |
| 2013/0270917 | A1 * | 10/2013 | Yatsu | H02J 1/00 307/77 |
| 2013/0343103 | A1 * | 12/2013 | Takizawa | H02H 7/1203 363/53 |
| 2014/0063884 | A1 * | 3/2014 | Itoh | H02M 7/487 363/132 |
| 2014/0063885 | A1 * | 3/2014 | Itoh | H02M 7/487 363/132 |
| 2014/0192572 | A1 * | 7/2014 | Tamai | H02M 7/487 363/56.12 |
| 2014/0293667 | A1 * | 10/2014 | Schroeder | H02M 7/483 363/60 |
| 2014/0339899 | A1 * | 11/2014 | Takizawa | H02M 7/487 307/63 |
| 2014/0347905 | A1 * | 11/2014 | Takizawa | H02M 7/537 363/131 |
| 2015/0249403 | A1 * | 9/2015 | Sato | H02M 7/537 363/127 |
| 2015/0280608 | A1 * | 10/2015 | Yoscovich | H02M 7/483 363/131 |
| 2015/0295515 | A1 * | 10/2015 | Zabaleta Maeztu | H02M 7/483 363/71 |
| 2015/0311822 | A1 * | 10/2015 | Ma | H02M 7/53871 363/98 |
| 2016/0006368 | A1 * | 1/2016 | Kusuno | H02M 7/487 363/131 |
| 2016/0043659 | A1 * | 2/2016 | Xu | H02M 7/487 363/131 |
| 2016/0049884 | A1 * | 2/2016 | Tamai | H02M 7/483 363/95 |
| 2016/0094151 | A1 * | 3/2016 | Goh | H02M 7/4807 363/8 |
| 2016/0141870 | A1 * | 5/2016 | Hasegawa | H02M 7/487 307/77 |
| 2016/0190956 | A1 * | 6/2016 | Levilly | H02M 7/537 363/97 |
| 2016/0211749 | A1 * | 7/2016 | Okada | H02M 7/487 |
| 2016/0268924 | A1 * | 9/2016 | Fu | H02M 7/483 |
| 2016/0285363 | A1 * | 9/2016 | Englekirk | H02M 3/07 |

FOREIGN PATENT DOCUMENTS

| | | | |
|---|---|---|---|
| JP | 2010-93978 | A | 4/2010 |
| JP | 2013-78204 | A | 4/2013 |
| JP | 2013-85358 | A | 5/2013 |
| JP | 2013-146117 | A | 7/2013 |
| JP | 2015-8566 | A | 1/2015 |

OTHER PUBLICATIONS

Xiaofeng Yang et al., Power Quality Controller Based on Hybrid Modular Multilevel Converter, IEEE International Symposium, Industrial Electronics (ISIE), May 28, 2012, pp. 1997-2002.

Peter Barbosa et al., Active Neutral-Point-Clamped Multilevel Converters, Power Electronics Specialists Conference, IEEE 36$^{th}$ , Jan. 1, 2005, pp. 2296-2301.

Extended European Search Report, dated May 24, 2017, 10 pages.

* cited by examiner

2E OUTPUT

E OUTPUT

0 OUTPUT

-E OUTPUT

-2E OUTPUT

2E OUTPUT

E OUTPUT

0 OUTPUT

-E OUTPUT

-2E OUTPUT

MULTILEVEL POWER CONVERSION DEVICE WITH FLYING CAPACITOR

TECHNICAL FIELD

This invention relates to a multiphase multilevel power conversion device, and more specifically to a multilevel power conversion device using a flying capacitor common to respective phases.

BACKGROUND ART

FIG. 29 shows a circuit configuration diagram showing a multilevel power conversion device in a patent document 1. By setting a phase voltage reference point to a terminal 0, controlling direct current voltage sources DCC1 and DCC2 to 2E, and controlling flying capacitors FC1 and FC2 to E, it is possible to output a phase voltage of five levels of 2E, E, 0, −E, and −2E from output terminals U, V, and W.

Besides, in FIG. 29, maximum voltages applied to switching elements Su1 to Su8, Sv1 to Sv8, and Sw1 to Sw8, and diode elements Su9 to Su12, Sv9 to Sv12, and Sw9 to Sw12 in a steady state are E. For equalizing these maximum applying voltages of all the switching elements and the diode elements, Su6*b* and Su8 are connected in series to each other. This is also applied to the switching elements Su1 and Su5*b*, Sv6*b* and Sv8, Sv7 and Sv5*b*, Sw6*b* and Sw8, Sw7 and Sw5*b*, Su9 and Su10, Su11 and Su12, Sv9 and Sv10, Sv11 and Sv12, Sw9 and Sw10, and Sw11 and Sw12.

Moreover, there is proposed a multilevel power conversion device shown in FIG. 30. In the circuits shown in FIG. 29 and FIG. 30, used direct current voltage sources DCC1 and DCC2, and flying capacitors FC1 and FC2 are common to the three phases. With this, the number of the capacitors are decreased, and the size of the device is decreased.

PRIOR ART DOCUMENT

Patent Document

Patent Document 1: Japanese Patent Application Publication No. 2013-132261

SUMMARY OF THE INVENTION

The circuit of FIG. 29 can output phase voltages of 5 levels. One phase is constituted by ten switching elements and four diode elements. When three-phases DC/AC convertor is considered in FIG. 29, the number of the used switching elements is 30. The number of the diode elements is 12. The number of the summation is 42. In this way, in the conventional multilevel power conversion device, the number of the used elements are many. The cost of the device is high. The size of the device is increased.

The multilevel power conversion device shown in FIG. 30 can arbitrarily select charge and discharge patterns of common flying capacitors, irrespective of outputted phase voltage levels. However, elements other than the direct current voltage sources DCC1 and DCC2, and the flying capacitors FC1 and FC2 are independently used in the respective phases. Accordingly, the number of the switching elements are many. The cost of the device is high. The size of the device is large. For example, 5 level power conversion device of the three phases needs 48 switching elements in the three phases.

Moreover, by providing the switching elements S1 and S2 which are common to the M phases as shown in FIG. 31, it is possible to decrease the total number of the used switching elements. However, it is not possible to arbitrarily select the charge and discharge patterns of the flying capacitors FC1 and FC2 which are common to the respective phases.

FIG. 32 shows switching patterns of the output phase voltage levels E and −E. FIG. 33 shows an example of a charge and discharge pattern which cannot be arbitrarily selected in the flying capacitor FC2. In this case, ○ in the drawing represents a switching element which is conducted (turned on).

As shown in FIG. 32, the output phase voltage levels E and −E have, respectively, two pattern output methods. In the pattern of E, it is possible to charge and discharge the flying capacitor FC2. In the pattern of −E, it is possible to charge and discharge the flying capacitor FC1.

However, in a case where the patterns of FIGS. 32(*b*) and (*d*) are simultaneously used when the U phase is E, the V phase is 0, and the W phase is −E as shown in FIG. 33, the switching elements Su4, Su14, and S1 are simultaneously conducted with each other. Accordingly, the direct current power source DCC2 and the flying capacitor FC2 are short-circuited.

Accordingly, for outputting E to avoid the short-circuit of the direct current voltage source DCC2 and the flying capacitor FC2, the output pattern of FIG. 32(*b*) cannot be applied. It is limited to the output pattern of FIG. 32(*a*). In this way, in a case where the pattern of the charge and the discharge is limited, it is not possible to arbitrarily switch the charge and the discharge of the flying capacitors FC1 and FC2. The control method is complicated.

It is, therefore, an object of the present invention to provide a multiphase multilevel power conversion device devised to decease a number of used elements, and to decrease a cost and a size of the device.

The present invention was devised in consideration of the above-described conventional problems. According to one aspect of the present invention, a multilevel power conversion device configured to generate an alternating current output which is converted to a plurality of voltage levels from voltages of a direct current voltage source, a flying capacitor, and a capacitor, the multilevel power conversion device comprising:

the N ($N \geq 2$) direct current voltage sources which are connected in series with each other, and which are common to respective phases;

a first flying capacitor which has one end connected to a negative electrode terminal of each of the direct current voltage sources, and which are common to the respective phases;

a second flying capacitor which has one end connected to a positive electrode terminal of each of the direct current voltage sources, and which are common to the respective phases; and a phase module of a M phase ($M \geq 2$) including;

- a positive electrode terminal and a negative electrode terminal of the first flying capacitor, and a positive electrode terminal and a negative electrode terminal of the second flying capacitor being set to an input terminal;
- one end of each of switching elements being connected to each of the input terminal,
- other ends of adjacent two of the switching elements being connected to each other,
- these being repeated until a final stage in which a number of the switching elements becomes two, two of the switching elements of an output stage being connected in series between the other ends of the two of the switching elements of the final stage, a capacitor being connected in parallel with the two of the switching elements of the output stage, a common connection point of the switching elements of the output stage being set to an output terminal, the phase module of a M phase (M≥2) being configured to output, from the output terminal, a potential of one of the input terminals, or a potential obtained by adding or subtracting the voltage of the capacitor to or from the potential of the one of the input terminals, by selectively controlling the respective switching elements in an ON/OFF manner.

According to another aspect of the invention, a multilevel power conversion device configured to generate an alternating current output which is converted to a plurality of voltage levels from voltages of a direct current voltage source, a flying capacitor, and a capacitor, the multilevel power conversion device comprising:

N (N≥2) direct current voltage sources which are connected in series with each other, and which are common to the respective phases;

a first flying capacitor having a positive electrode terminal connected to a common connection point between a nth direct current voltage source (n: odd number) and a (n+1)th direct current voltage source (n+1: even number);

a second flying capacitor having a negative electrode terminal connected to a common connection point between nth direct current voltage source and (n+1) direct current voltage source; and a phase module of a M phase (M≥2) including;

the negative electrode terminal of the nth direct current voltage source, the negative electrode terminal of the first flying capacitor, the positive electrode terminal of the nth direct current power source, and the positive electrode terminal of the second flying capacitor being set to input terminals, one end of each of the switching elements being connected to one of the input terminals, the other ends of adjacent two of the switching elements being connected to each other, the one end of the switching element being connected to the common connection point between the switching elements which have the other ends connected to each other, these being repeated until a final stage in which a number of the switching elements becomes two, two of the switching elements of the output stage being connected in series with each other between the other ends of two of the switching elements of the final stage, a capacitor being connected in parallel with two of the switching elements of the output stage, the common connection point of the switching elements of the output stage being set to an output terminal, the phase module of M phases (M≥2) being configured to output a potential of one of the input terminals, or a potential obtained by adding or subtracting the voltage of the capacitor to or from the potential of the one of the input terminals, by selectively controlling the respective switching elements in an ON-OFF manner.

According to another aspect of the invention, a multilevel power conversion device configured to generate an alternating current output which is converted to a plurality of voltage levels from voltages of a direct current voltage source, a flying capacitor, and a capacitor, the multilevel power conversion device comprising:

two direct current voltage sources which are connected to each other, and which are common to respective phases;

N flying capacitors of first to Nth flying capacitors which have negative electrode terminals that are connected in order in series with a negative electrode terminal of the first direct current voltage source, and which are common to the respective phases;

N flying capacitors of 2Nth to (N+1)th flying capacitors which have positive electrode terminals connected in order in series with a common connection point between the first direct current voltage source and the second direct current voltage source, and which are common to the respective phases;

N flying capacitors of 2N+1 to 3Nth flying capacitors which have negative electrode terminals connected in order in series with the common connection point between the first direct current voltage source and the second direct current voltage source, and which are common to the respective phases;

N flying capacitors of 4Nth to (3N+1)th flying capacitors which have positive electrode terminals connected in order in series with the positive electrode terminal of the second direct current voltage source, and which are common to the respective phases; and a phase module of a M phase (M≥2) including;

the positive electrode terminal and the negative electrode terminal of the first flying capacitor, the positive electrode terminals of the second to Nth flying capacitors, the negative electrode terminals of the N+1 to 2Nth flying capacitors, the positive electrode terminals of the 2N+1 to 3Nth flying capacitors, the negative electrode terminals of the (3N+1) to (4N−1) flying capacitors, and the positive electrode terminal and the negative electrode terminal of the 4Nth flying capacitor being set to input terminals, one ends of the switching elements being connected to the respective input terminals, the other ends of adjacent two of the switching elements being connected to each other, the one end of the switching element being connected to the common connection point between the switching elements which have the other ends connected to each other, these being repeated until a final stage in which a number of the switching element becomes two, two of the switching elements of the output stage being connected in series with each other between the other ends of the two of the switching elements of the final stage, a capacitor being connected in parallel to the two of the switching elements of the output stage, a common connection point of the switching elements of the output stage being set to an output terminal, the phase module of M phases (M≥2) which are configured to output, from the output terminal, a potential of one of the input terminals, or a potential obtained by adding or subtracting a voltage of the capacitor to or from the potential of the input terminals, by selectively controlling the switching elements in an ON-OFF manner.

According to another aspect of the invention, a multilevel power conversion device configured to generate an alternating current output which is converted to a plurality of voltage levels from voltages of a direct current voltage source, a flying capacitor, and a capacitor, the multilevel power conversion device comprising:

two direct current voltage sources which are connected in series with each other, and which are common to respective phases;

N flying capacitors of first to Nth flying capacitors which have negative electrode terminals connected in order in series with the negative electrode side of the first direct current voltage sources, and which are common to the respective phases;

N flying capacitors of (N+1) to 2Nth flying capacitors which have positive electrode terminals connected in order in series with a positive electrode side of the second direct current voltage source, and which are common to the respective phases;

a phase module of a M phase (M≥2) including;

positive and negative electrode terminals of the first flying capacitor, positive electrode terminals of the second to Nth flying capacitors, negative electrode terminals of (N+1)th to (2N+1)th flying capacitors, and positive and negative electrode terminals of the 2N flying capacitor being set to input terminals, one end of the switching elements being connected to the respective input terminals, the other ends of adjacent two of the switching elements being connected to each other, one end of the switching element being connected to the common connection point between the switching elements which have the other ends connected to each other, these being repeated until a final stage in which a number of the switching elements becomes two, two of the switching elements of the output stage being connected in series with each other between the other ends of the two of the switching elements of the final stage, a capacitor being connected in parallel with the two of the switching elements of the output stage, the phase module of M phases (M≥2) being configured to output a potential of one of the input terminals, or a potential obtained by adding a voltage of the capacitor to or from the potential of the one of the input terminals, by selectively controlling the switching elements in an ON-OFF manner.

Moreover, the first direct current voltage source and the second direct current voltage source are integrated to one direct current voltage source.

According to another aspect of the invention, a multilevel power conversion device configured to generate an alternating current output which is converted to a plurality of voltage levels from voltages of a direct current voltage source, a flying and a capacitor, the multilevel power conversion device comprising:

2N+2 direct current voltage sources (N≥1) which are connected in series with each other, and which are common to respective phases;

a phase module of a M phase (M≥2) including;

positive electrode terminals and negative electrode terminals of first and (2N+2)th direct current voltage sources, positive electrode terminals of second to Nth direct current voltage sources, and negative electrode terminals of (N+3)th to (2N+1)th direct current voltage sources being set to input terminals, one end of the switching element being connected to the respective input terminals, the other ends of adjacent two of the switching elements being connected to each other, one end of the switching element being connected to a common connection point between the switching elements having the other ends connected to each other, these being repeated until a final stage in which a number of the switching elements becomes two, two of the switching elements of the output stage being connected in series with each other between the other ends of two of the switching elements of the final stage, a capacitor being connected in parallel with the two of the switching elements of the output stage, the common connection point between the switching elements of the output stage being set to the output terminal, the phase module of M phases (M≥2) configured to output a potential of one of the input terminals, or a potential obtained by adding a voltage of the capacitor to or from the potential of the one of the input terminals, by selectively controlling the switching elements in an ON-OFF manner.

Moreover, the (N+1)th direct current voltage source and the (N+2)th direct current voltage source are integrated to one direct current voltage source.

According to another aspect of the invention, a multilevel power conversion device configured to generate an alternating current output which is converted to a plurality of voltage levels from a direct current voltage, the multilevel power conversion device comprising:

N direct current voltage sources (N≥2) which are connected in series with each other, and which are common to respective phases;

a basic cell including a first semiconductor element having one end connected to positive electrode terminals of the respective direct current power sources, a second semiconductor element having one end connected to negative electrode terminals of the second direct current power source, a flying capacitor connected between the other end of the first semiconductor element and the other end of the semiconductor element, and third and fourth semiconductor elements connected in series between the common connection point of the first semiconductor element and the flying capacitor, and the common connection point of the second semiconductor element and the flying capacitor; and a phase module of M phases (M≥3) including;

at least one of the one end of the first semiconductor element and the one end of the second semiconductor element, and a common connection point of the third and fourth semiconductor elements being set to input terminals, a switching element disposed between the respective input terminals and the output terminal, the phase module being configured to selectively control the respective switching elements in an ON-OFF manner.

According to another aspect of the invention, in the phase module, one end of the switching element is connected to the respective input terminals, the other ends of the adjacent two of the switching elements are connected to each other, one end of the switching element is connected to a common connection point between the switching elements which have the other ends that are connected to each other, these constitution are repeated until a final stage in which a number of the switching elements becomes two, the two switching elements of the output stage are connected in series between the other ends of the two of the switching elements of the final stage, the capacitor is connected in parallel with two of the switching elements of the output stage, a common connection point between the switching elements of the output stage is set to the output terminal; and the phase module is configured to output, from an output terminal, a potential of one of the terminals of the input terminals, or a potential obtained by adding or subtracting a voltage of the capacitor to or from a potential of one of the input terminals.

According to another aspect of the invention, in the phase module, one end of the first switching element is connected to one of one end of the first semiconductor element and one end of the second semiconductor element, one end of the second switching element is connected to a common connection point between the third and fourth semiconductor element, the other ends of the first and second switching elements are connected to each other, one end of the third switching element is connected to a common connection point between the first and second switching elements, one end of a direct current circuit in which the fourth switching element and the fifth switching element are connected in series with each other, a cathode of a first diode and an anode of a second diode are connected to the other of the common connection point between the one end of the first semiconductor element and the one end of the second semiconductor element, a direct current circuit in which the fourth switching element and the fifth switching element are connected in series with each other is connected in parallel to the first diode and the second diode, a common connection point between the fourth and fifth switching elements is set to an output terminal, or the one end of the switching element is connected to the common connection point between the fourth and fifth switching elements, the other ends of adjacent two of the switching elements are connected to each other, the switching element is connected to a common connection point between the switching elements having the other ends that are connected to each other, this is repeated until an output stage in which a number of the switching elements becomes two, the common connection point of the two switching elements of the output stage is set to an output terminal;

the phase module is configured to output, from the output terminal, a potential of one of the input terminals, by selectively controlling the respective switching elements in an ON-OFF manner.

According to another aspect of the invention, in the phase module, one end of the first switching element is connected to one of one end of the first semiconductor element and one end of the second semiconductor element, one end of the second switching element is connected to a common connection point between the third and fourth semiconductor elements, the other ends of the first and second switching elements are connected to each other, one end of the third switching element is connected to the common connection point between the first and second switching elements, one end of a bidirectional switch is connected to a common connection point of the other of the one end of the first semiconductor element and the one end of the second semiconductor element, the common connection point between the third switching element and the bidirectional switch is connected to the output terminal, the phase module is configured to output a potential of one of the input terminals from the output terminal, by selectively controlling the respective switching elements.

According to another aspect of the invention, two switching elements are connected in series between the other ends of adjacent two of the switching elements which are other than the final stage, the capacitor is connected in parallel with the two switching elements which are connected in series with each other, one end of the switching element of a next stage is connected to a common connection point of the two switching elements which are connected in series with each other;

a potential of one of the input terminals, or a potential obtained by adding or subtracting a voltage of a capacitor connected in parallel with the switching element of the output stage, and a voltage of a capacitor connected in parallel with the switching element connected in series between adjacent two of the switching elements which are other than the final stage by selectively controlling the respective switching elements in an ON-OFF manner is outputted from the output terminal.

Moreover, the respective direct current voltage sources are divided into two or more direct current connections.

Furthermore, a part or all of the switching elements and the semiconductor elements are divided into two or more direct current connections. A part or all of the switching elements and the semiconductor elements are divided into two or more parallel current connections.

In the multiphase multilevel power conversion device according to the present invention, it is possible to decrease the number of the used elements, and to decrease the cost and the size of the device.

DESCRIPTION OF EMBODIMENTS

Hereinafter, first to seventeenth embodiments of multilevel power conversion devices according to the present invention are illustrated in detail with reference to FIGS. 1 to 28.

First Embodiment

Figure 1:
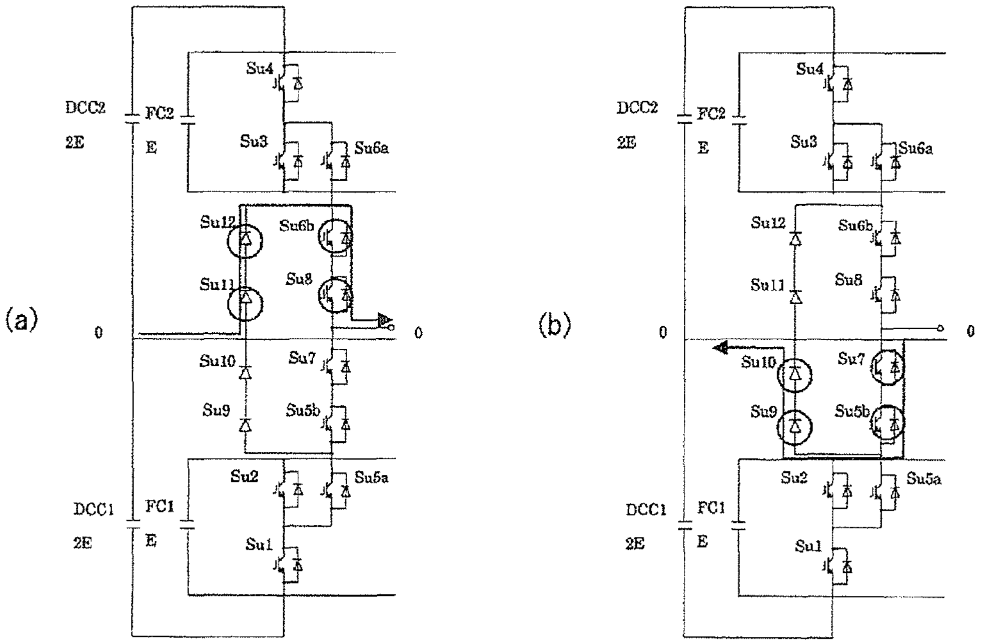
FIG. 1 are schematic views showing a pattern at 0 output in a conventional circuit.
Figure 29:
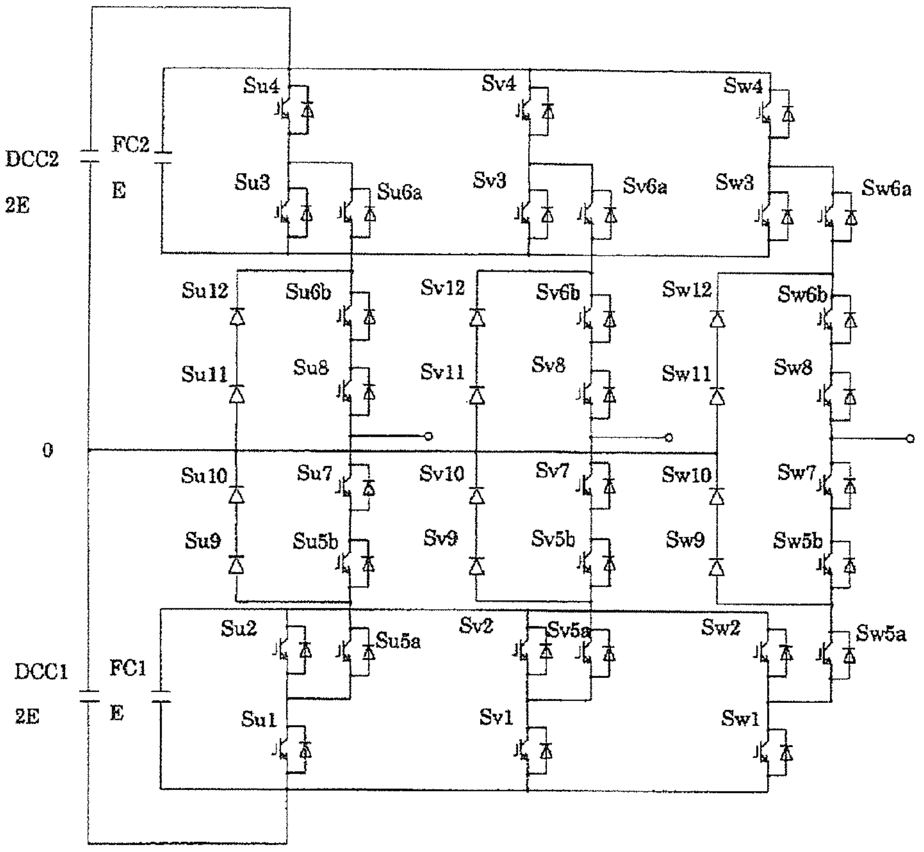
FIG. 29 is a circuit configuration view showing one example of a conventional multilevel power conversion device.

FIG. 1 shows an example of a pattern in which a phase voltage 0 is outputted in a conventional art shown in FIG. 29. In the conventional art shown in FIG. 29, the phase voltage 0 is outputted by using diode elements Su9 to Su12. However, these diode elements Su9 to Su12 can be omitted if it is possible to output the phase voltage 0 by other means.

Figure 2:
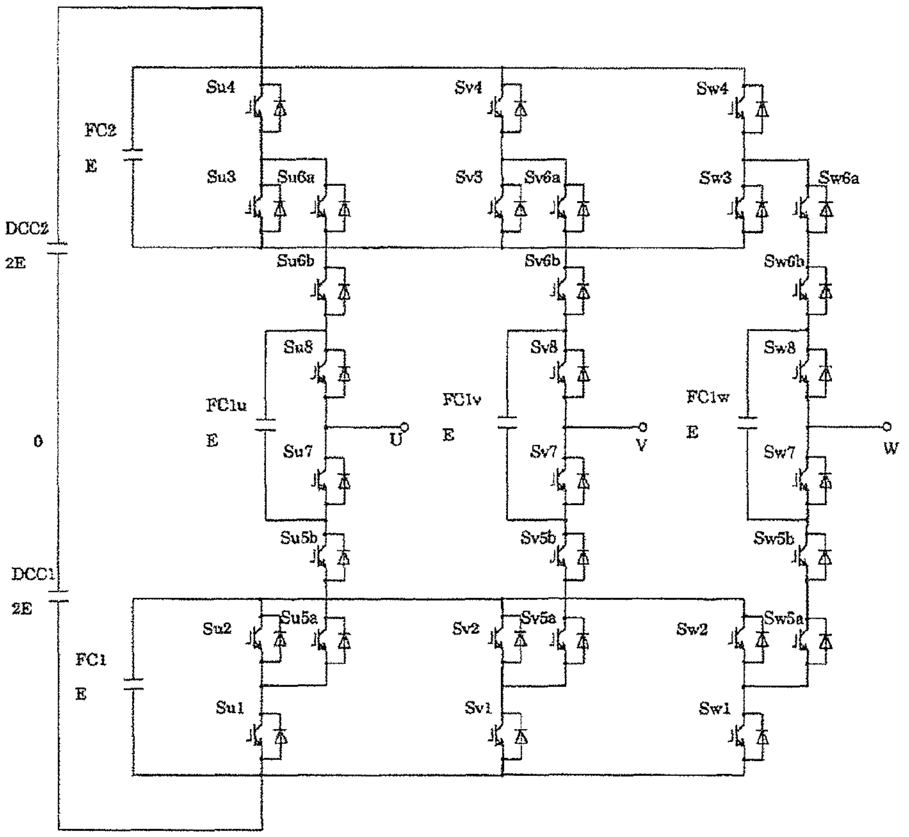
FIG. 2 is a circuit configuration view showing a multilevel power conversion device according to a first embodiment.

In this first embodiment, as shown in FIG. 2, the diode elements Su9 to Su12, Sv9 to Sv12, and Sw9 to Sw12 are omitted by connecting new (newly-added) flying capacitors FC1, FC1*v*, and FC1*w* to respective phases. With this, the number of the elements are reduced.

Hereinafter, a circuit diagram of the multilevel power conversion device according to the first embodiment is illustrated with reference to FIG. 2. The multilevel power conversion device according to the first embodiment includes direct current voltage sources DCC1 and DCC2, and flying capacitors FC1 and FC2 which are common to the respective phases. By the phase modules provided to the respective phases, the voltage is selected, and outputted from output terminals U, V, and W. The phase module includes switching elements Su1 to Su8, and a capacitor FC1*u* in the U phase.

Hereinafter, a concrete circuit diagram of the U phase is illustrated as an example. A direct current voltage source (a direct current capacitor or a direct current power source) DCC1 and DCC2 are connected in series with each other. A common connection point (neutral point) between the direct current voltage source DCC1 and DCC2 is set to a terminal 0.

A negative electrode terminal of the flying capacitor FC1 which is common to the respective phase is connected to a negative electrode terminal of the direct current voltage source DCC1. A positive electrode terminal of the flying capacitor FC2 is connected to a positive electrode terminal of the direct current voltage source DCC2.

The positive electrode terminal and negative electrode terminal of the flying capacitor FC1, and the positive electrode terminal and the negative electrode terminal of the flying capacitor FC2 are connected to phase modules of respective phases, as input terminals.

One ends of the switching elements Su1 to Su4 are connected to the input terminals. The other ends of adjacent switching elements Su1 and Su2 are connected with each other. The other ends of adjacent switching elements Su3 and Su4 are connected with each other. One end of the switching elements Su5*a* is connected to a common connection point between the adjacent switching elements Su1 and Su2. One end of the switching element Su6*a* is connected to a common connection point between the adjacent switching elements Su3 and Su4. The switching elements Su7 and Su8 of the output stage are connected in series to each other in order between the other ends of the switching elements Su5*a* and Su6*a* of the final stage through the switching elements Su5*b* and Su6*tb*. The capacitor FC1*u* is connected in parallel with the switching elements Su7 and Su8 of the output stage. The common connection point between the switching elements Su7 and Su8 of the output stage is the output terminal U. Besides, the switching elements Su5*b* and Su6*b* are connected in series with the switching elements Su5*a* and Su6*a* for the withstand voltage.

By selectively controlling the respective switching elements of this phase module in an ON-OFF manner, it is possible to output the potential of one of the input terminals, or a potential obtained by adding or subtracting the voltage of the capacitor FC1*u* to or from the potential of one of the input terminals, from the output terminal U.

Besides, the V phase and W phase are similarly constructed.

In this circuit structure, by controlling the voltages of the direct current voltage source DCC1 and DCC2 to 2E, and by controlling the voltages of the flying capacitor FC1 and FC2, and the capacitors FC1*u*, FC1*v*, and FC1*w* to E, it is possible to output phase voltages of 5 levels of 2E, E, 0, −E, −2E from the output terminals U, V, and W. Besides, the reference point of the phase voltage is the terminal 0. Besides, in a case where a three-phase DC/AC conversion device is considered, the number of the used switching elements is 30, and the number of the used diode elements is 0.

By using the capacitors FC1*u*, FC1*v*, and FC1*w*, it is possible to output 0 voltage from output terminals U, V, and W. Accordingly, it is possible to omit the diode elements Su9 to Su12, Sv9 to Sv12, and Sw9 to Sw12 of the conventional art. It is possible to decrease the number of the used diode elements by 12, relative to the conventional circuit diagram shown in FIG. 29.

Accordingly, it is possible to decrease the number of the diode elements to 0 without varying the number of the switching elements, relative to the circuit configuration shown in FIG. 29.

Figure 3:
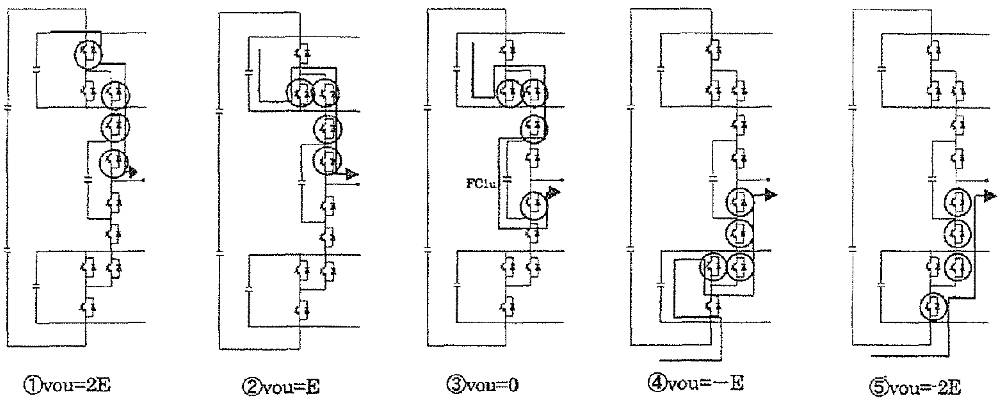
FIG. 3 are schematic views showing examples of operations at each output voltage in the first embodiment.

Typical switching patterns of the U phase is shown in a table 1 and FIG. 3. By switching by the patterns shown in the table 1, it is possible to output the phase voltages of the 5 levels of 2E, E, 0, −E, −2E. ○ in figure shows a switching element which is conducted.

TABLE 1

| Su4 | Su6a | Su6b | Su8 | Su7 | Su5b | Su5a | Su1 | Su3 | Su2 | vou |
|---|---|---|---|---|---|---|---|---|---|---|
| ON | ON | ON | ON | OFF | OFF | OFF | OFF | OFF | OFF | 2E |
| OFF | ON | ON | ON | OFF | OFF | OFF | OFF | ON | OFF | E |
| OFF | ON | ON | OFF | ON | OFF | OFF | OFF | ON | OFF | 0 |
| OFF | OFF | OFF | OFF | ON | ON | ON | OFF | OFF | ON | −E |
| OFF | OFF | OFF | OFF | ON | ON | ON | ON | OFF | OFF | −2E |

The voltages applied to the flying capacitors are illustrated. In the patterns of (2) and (3) of FIG. 3, the flying capacitor FC2 is charged. Moreover, the capacitor FC1*u* is charged at the pattern of (3) of FIG. 3. Furthermore, although it is not shown in FIG. 3, there are a pattern in which the flying capacitor FC1 is charged, and a pattern in which the flying capacitor FC1 and FC2, and the capacitor FC1*u* is discharged. By performing these charge and discharge, it is possible to control the voltages of the flying capacitors FC1 and FC2, and the flying capacitor FC1*u* to E while the phase voltage is outputted.

Besides, in the first embodiment shown in FIG. 2, the maximum voltages applied to the switching elements in the steady state are E. This is identical to a value of the conventional art shown in FIG. 29.

As described above, in the multilevel power conversion device according to the first embodiment, it is possible to decrease the number of the elements. Moreover, it is possible to decrease the cost and the size of the device.

Second Embodiment

Figure 4:
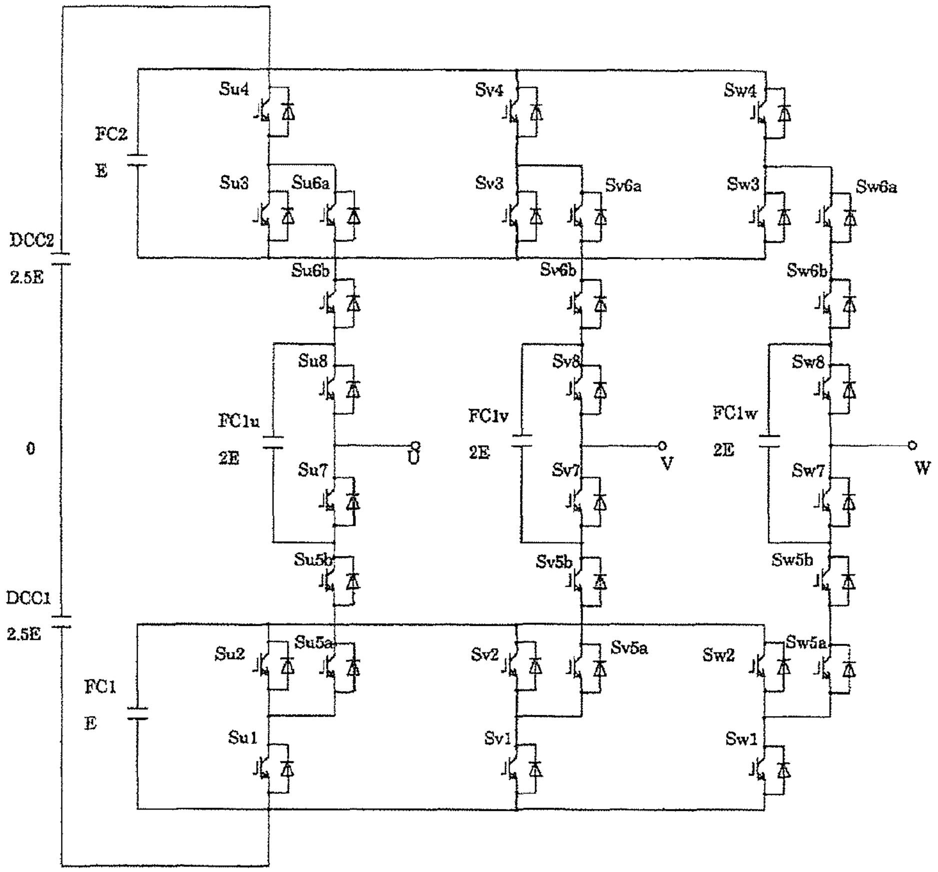
FIG. 4 is a circuit configuration view showing a multilevel power conversion device according to a second embodiment.

FIG. 4 shows a circuit configuration of a multilevel power conversion device according to a second embodiment. The second embodiment has a circuit configuration which is identical to that of the first embodiment. However, voltage ratios of the direct current voltage sources DCC1 and DCC2, the flying capacitors FC1 and FC2, and the capacitors FC1*u*, FC1*v*, and FC1*w* are varied. Besides, the reference point of the phase voltage is the terminal 0.

Figure 5:
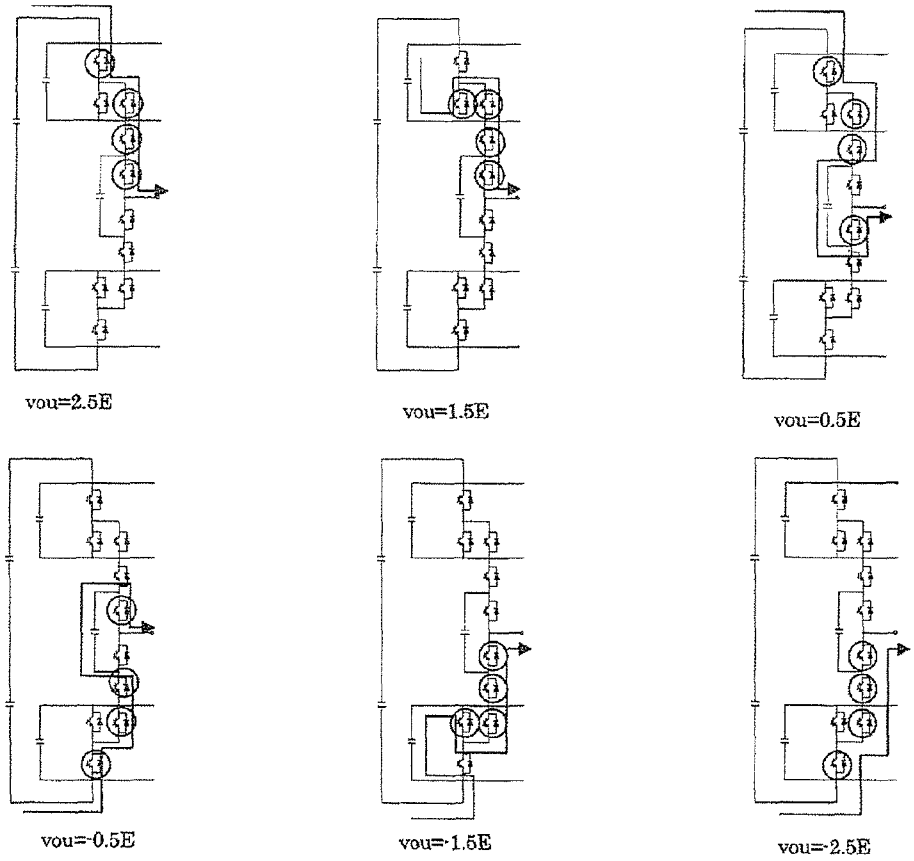
FIG. 5 are schematic views showing an example of operations at each output voltage in the second embodiment.

In the second embodiment, the voltages of the direct current voltage sources DCC1 and DCC2 are controlled to 2.5E. The voltages of the flying capacitors FC1 and FC2 are controlled to E. The voltages of the capacitors FC1*u*, FC1*v*, and FC1*w* are controlled to 2E. With these, it is possible to output the phase voltage of 6 levels of 2.5E, 1.5E, 0.5E, −0.5E, −1.5E, and −2.5E from the output terminals U, V, and W. FIG. 5 shows an operation example and current paths of respective output voltages.

In this way, by varying the voltage ratios of the direct current voltage sources DCC1 and DCC2, and the flying capacitors FC1 and FC2, and the capacitors FC1*u*, FC1*v*, and FC1*w*, it is possible to enlarge the number of the levels relative to the first embodiment. Consequently, it is possible to increase the number of the levels relative to the first embodiment while the number of the switching elements are maintained to the same number. Accordingly, it is possible to suppress the output voltage and the harmonic of the current.

Third Embodiment

Figure 6:
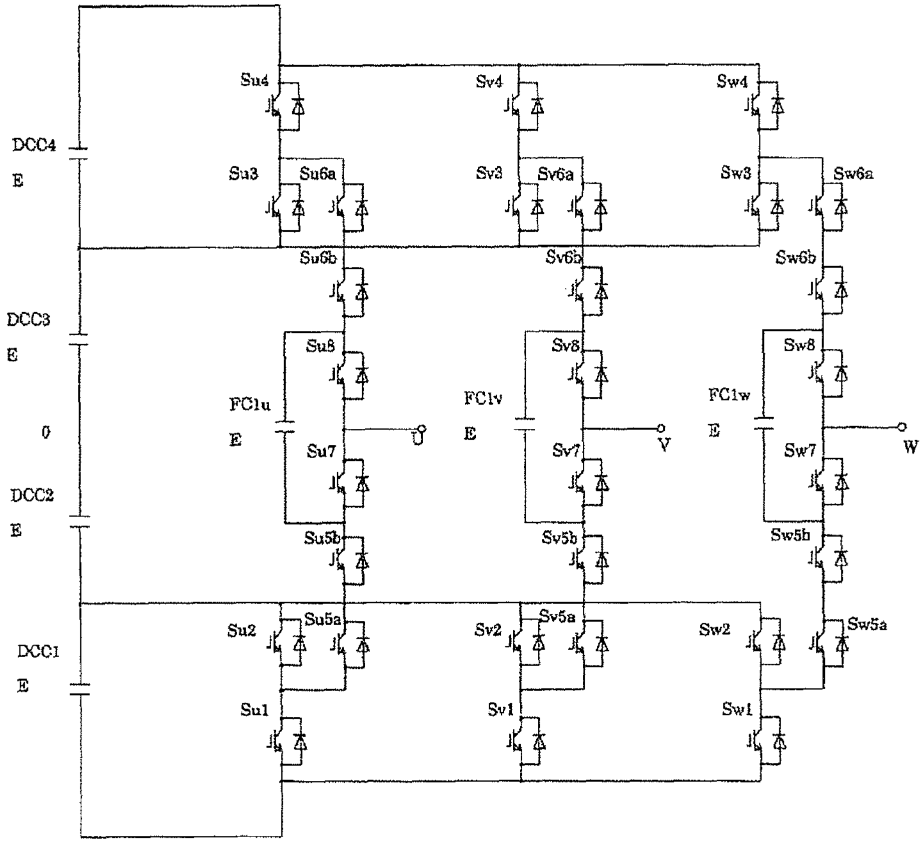
FIG. 6 is a circuit configuration view showing a multilevel power conversion device according to a third embodiment.

FIG. 6 shows a circuit configuration of a multilevel power conversion device according to the third embodiment. The multilevel power conversion device of the third embodiment is provided with direct current voltage sources DCC1 to DCC4 which are common to the respective phases. By the phase modules provided to the respective phases, the voltage is selected, and outputted from the output terminals U, V, and W. The phase module is provided with the switching elements Su1 to Su8, and the capacitor FC1*u* in the U phase.

Hereinafter, a concrete circuit configuration of the U phase is illustrated as an example. The direct current voltage sources (the current capacitors or the direct current power sources) DCC1 to DCC4 are connected in series with each other. A common connection point (a neutral point) between the direct current voltage sources DCC2 and DCC3 is set to a terminal 0.

The positive and negative electrode terminals of the direct current voltage source DCC1 and, and the positive and negative electrode terminals of the direct current voltage source DCC4 are connected, as the input terminals, to the phase modules of the respective phases.

One ends of the first switching elements Su1 to Su4 are connected to the input terminals. The other ends of adjacent switching elements Su1 and Su2 are connected to each other. The other ends of adjacent switching elements Su3 and Su4 are connected to each other. One ends of the switching elements Su5*a* and Su6*a* are connected to the common connection points of the adjacent switching element Su1 and Su2, and the adjacent switching element Su3 and Su4. The switching elements Su7 and Su8 of the output stage are connected in series with each other in order between the other ends of the switching elements Su5*a* and Su6*a* of the final stage through the switching elements Su5*b* and Su6*b*. The capacitor FC1*u* is connected in parallel with the switching elements Su7 and Su8 of the output stage. The common connection point of the switching elements Su7 and Su8 of the output stage is set to the output terminal.

By selectively controlling the respective switching elements of this phase module in an ON-OFF manner, it is possible to output the potential of one of the input terminals, or a potential obtained by adding or subtracting the voltage of the capacitor FC1*u* to or from the potential of one of the input terminals, from the output terminal U.

Besides, the V phase and W phase are similarly constructed.

In this circuit configuration, by controlling the voltages of the direct current voltage sources DCC1 to DCC4, and by controlling the voltages of the capacitors FC1*u*, FC1*v*, and FC1*w* to E, it is possible to output the phase voltages of 5 levels from the output terminals U, V, and W. Besides, the reference point of the phase voltage is the terminal 0.

In the multilevel power conversion device according to the third embodiment, it is possible to output 0 from the output terminals U, V, and W by using the flying capacitors FC1*u*, FC1*v*, and FC1*w* similarly to the first embodiment. Accordingly, it is possible to omit the diode elements Su9 to SU12, Sv9 to Sv12, and Sw9 to Sw12 of the conventional art (FIG. 29). It is possible to decrease the number of the used diode elements by 12, relative to the conventional circuit configuration.

Besides, the maximum voltages applied to the switching elements in the steady state are E similarly to the first embodiment and the second embodiment.

Moreover, it is possible to enlarge the number of the levels by varying the voltage ratio similarly to the second embodiment. For example, in a case where the voltages of the direct current power sources DCC1 and DCC4 are controlled to E, the voltages of DCC2 and DCC3 are controlled to 1.5E, and the voltages of the capacitors Fc1*u*, FC1*v*, FC1*w* are controlled to 2E, it is possible to output the phase voltages of 6 levels of 2.5E, 1.5E, 0.5E, −0.5E, −1.5E, −2.5E.

Fourth Embodiment

Figure 7:
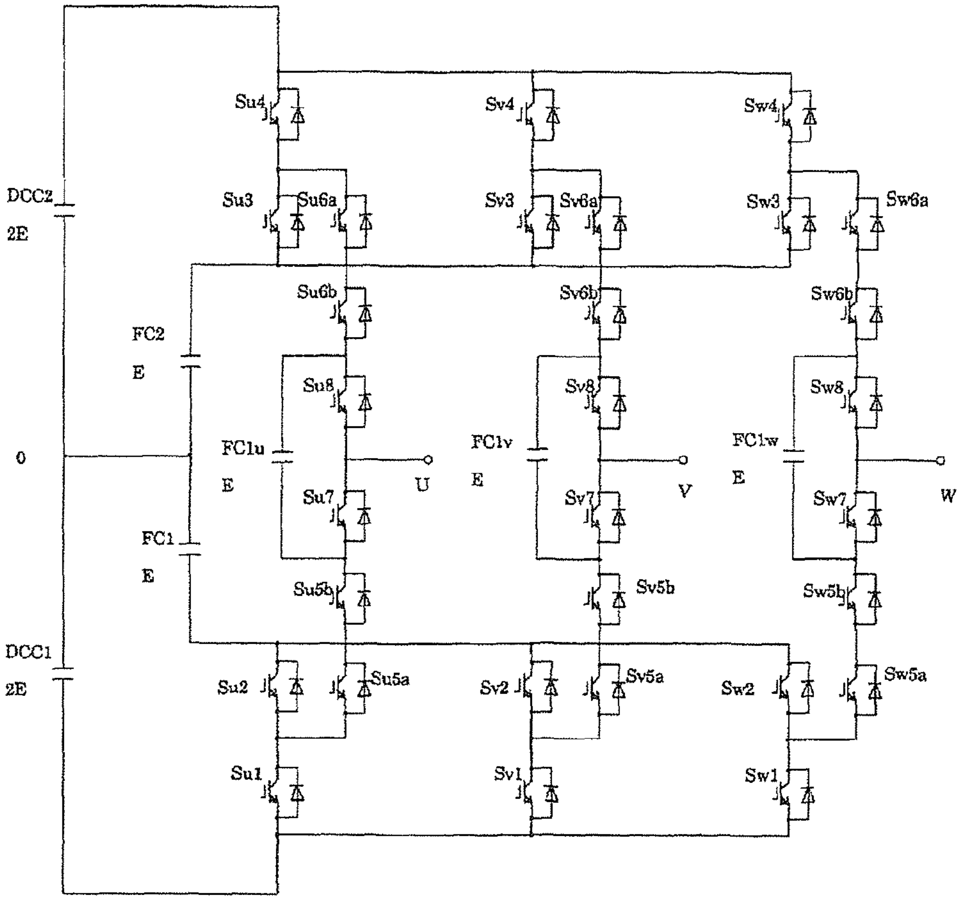
FIG. 7 is a circuit configuration view showing a multilevel power conversion device according to a fourth embodiment.

FIG. 7 shows a circuit configuration of a multilevel power conversion device according to a fourth embodiment.

Hereinafter, a circuit configuration of the multilevel power conversion device according to the fourth embodiment is illustrated. The multilevel power conversion device includes direct current voltage sources DCC1 and DCC2, and the flying capacitors FC1 and FC2 which are in common to the respective phases. The phase modules provided to the respective phases selects the voltage, and outputs from the output terminals U, V, and W. The phase modules in the U phase includes switching elements Su1 to Su8, and the capacitor FC1*u*.

Hereinafter, a concrete circuit configuration of the U phase is illustrated as an example. The direct current voltage sources (the direct current capacitor or the direct current power source) DCC1 and DCC2 are connected in series with each other. The common connection point (the neutral point) of these direct current voltage sources DCC1 and DCC2 is set to the terminal 0.

The positive electrode terminal of the flying capacitor FC1 and the negative electrode terminal of the flying capacitor FC2 are connected to the common connection point between the direct current voltage source DCC1 and DCC2.

The negative electrode terminal of the direct current voltage source DCC1, the negative electrode terminal of the flying capacitor FC1, the positive electrode terminal of the direct current voltage source DCC2, and the positive electrode terminal of the flying capacitor FC2 are connected, as the input terminals, to the phase modules.

One ends of the first switching terminals Su1 to Su4 are connected to the input terminals. The other ends of the adjacent switching elements Su1 and Su2 are connected to each other. The other ends of the adjacent switching elements Su3 and Su4 are connected with each other. The one ends of the switching elements Su5*a* and Su6*a* are connected to the common connection points between the adjacent switching elements Su1 and Su2, and the connection points between the adjacent switching elements Su3 and Su4. The switching elements Su7 and Su8 of the output stage are connected in series in order between the other ends of the switching elements Su5*a* and Su6*a* of the final stage through the switching elements Su5*b* and Su6*b*. The capacitor FC1*u* is connected in parallel with the switching elements Su7 and Su8 of the output stage. The common connection point of the switching elements Su7 and Su8 of the output stage is set to the output terminal U.

By selectively controlling the respective switching elements of this phase module in the ON-OFF manner, it is possible to output the potential of one of the input terminals, or the potential obtained by adding or subtracting the voltage of the capacitor FC1*u* to or from the potential of one of the terminals, from the output terminal U.

Besides, the V phase and the W phase have identical configuration.

The direct current voltage sources DCC1 and DCC2 are controlled to 2E. The flying capacitors FC1 and FC2 are controlled to E. The capacitors FC1*u*, FC1*v*, and FC1*w* are controlled to E. With these, it is possible to output the phase voltages of 5 levels of 2E, E, 0, −E, and −2E. Besides the reference point of the phase voltage is set to the terminal 0.

In the multilevel power conversion device according to the fourth embodiment, it is possible to output 0 from the output terminals U, V, and W by using the capacitors FC1*u*, FC1*v*, and FC1*w*, similarly to the first embodiment. Accordingly, it is possible to omit the diode elements Su9 to Su12, Sv9 to Sv12, and Sw9 to Sw12 of the conventional art (FIG. 29). It is possible to decrease the number of the used diode elements by 12 relative to the conventional circuit configuration of FIG. 29.

Besides, the maximum voltages applied to the switching elements in the steady state are E similarly to the first and second embodiments.

Moreover, it is possible to enlarge the number of the levels by varying the voltage ratio similarly to the second embodiment. For example, in a case where the voltages of the direct current voltage sources DCC1 and DCC2 are controlled to 2.5E, the voltages of the flying capacitors FC1 and FC2 are controlled to 1.5E, and the voltages of the capacitors FC1*u*, FC1*v*, FC1*w* are controlled to 2E, it is possible to output the phase voltages of 6 levels of 2.5E, 1.5E, 0.5E, −0.5E, −1.5E, and −2.5E.

Fifth Embodiment

Figure 8:
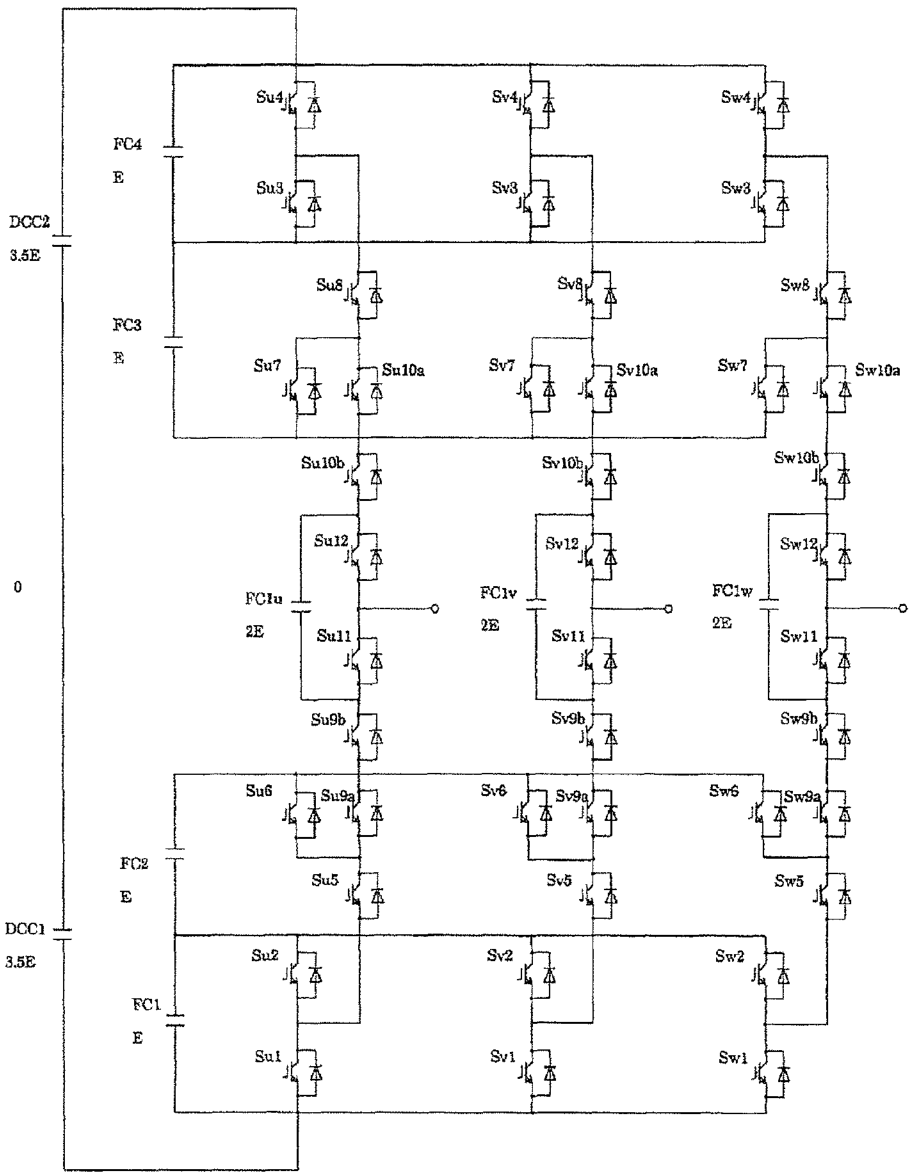
FIG. 8 is a circuit configuration view showing a multilevel power conversion device according to a fifth embodiment.

FIG. 8 shows a circuit configuration of a multilevel power conversion device according to a fifth embodiment.

Hereinafter, the circuit configuration of the multilevel power conversion device according to the fifth embodiment is illustrated. In the multilevel power conversion device according to the fifth embodiment, the flying capacitors FC1 and FC2 which are common to the respective phases in the multilevel power conversion device according to the first embodiment are set, respectively, to two stages. That is, the multilevel power conversion device includes the direct current voltage sources DCC1 and DCC2, and the flying capacitors FC1, FC2, FC3, and FC4 which are common to the respective phases. By the phase modules provided to the respective phase modules, the voltage is selected, and outputted from the output terminals U, V, and W. The phase module includes the switching elements Su1 to Su12, and the flying capacitor FC1*u* in the U phase.

Hereinafter, the concrete circuit configuration in the U phase is illustrated as the example. The direct current voltage sources (the direct current capacitor or the direct current power source) DCC1 and DCC2 are connected in series with each other. The common connection point (the neutral point) between the direct current voltage sources DCC1 and DCC2 is set to the terminal 0.

The negative electrode terminal of the flying capacitor FC1 is connected to the negative electrode terminal of the direct current voltage source DCC1. The flying capacitor FC2 is connected in series with the flying capacitor FC1.

The positive electrode terminal of the flying capacitor FC4 is connected to the positive electrode terminal of the direct current voltage source DCC2. The flying capacitor FC3 is connected in series with the flying capacitor FC4.

The positive electrode terminal and the negative electrode terminal of the flying capacitor FC1, the positive electrode terminal of the flying capacitor FC2, the negative electrode terminal of the flying capacitor FC3, and the positive electrode terminal and the negative electrode terminal of the flying capacitor FC4 are connected as the input terminals to the phase modules.

One ends of the switching elements Su1 to Su4, Su6, and Su1 are connected to the input terminals. The other ends of the adjacent switching elements Su1 and Su2 are connected to each other. The other ends of the adjacent switching elements Su3 and Su4 are connected to each other. The one ends of the switching elements Su5 and Su8 are connected to the common connection point of the adjacent switching elements Su1 and Su2, and the common connection point of the adjacent switching elements Su3 and Su4. The other ends of the adjacent switching elements Su5 and Su6 are connected to each other. The other ends of the adjacent switching elements Su7 and Su8 are connected to each other. The one ends of the switching elements Su9*a* and Su10*a* are connected to the common connection point of the adjacent switching elements Su5 and Su6, and the common connection point of the adjacent switching elements Su7 and Su8. The switching elements Su11 and Su12 of the output stage are connected in series with each other in order between the switching elements Su9*a* and Su10*a* of the final stage through the switching elements Su9*b* and Su10*b*. The capacitor FC1*u* is connected in parallel with the switching elements Su11 and Su12 of the output stage. The common connection point between the switching elements Su11 and Su12 of the output stage is the output terminal U.

By selectively controlling the respective switching elements of this phase module in the ON-OFF manner, it is possible to output the potential of one of the input terminals, or the potential obtained by adding or subtracting the voltage of the capacitor FC1*u* to or from the potential of one of the input terminals, from the output terminal U.

Besides, the V phase and the W phase have the identical configuration.

In a case where the voltages of the direct current voltage sources DCC1 and DCC2 are controlled to 3.5E, the voltages of the flying capacitors FC1, FC2, FC3, and FC4 are controlled to E, and the voltages of the capacitors FC1*u*, FC1*v*, and FC1*w* are controlled to 2E, it is possible to output the phase voltages of the 8 levels of 3.5E, 2.5E, 1.5E, 0.5E, −0.5E, −1.5E, −2.5E, and −3.5E from the output terminals U, V, and W. Besides, the reference point of the phase voltage is the terminal 0.

A table 2 shows typical switching patterns in the fifth embodiment.

TABLE 2

| Su4 | Su3 | Su8 | Su10a | Su10b | Su12 | Su11 | Su9b | Su9a | Su5 | Su1 | Su7 | Su6 | Su2 | U |
|---|---|---|---|---|---|---|---|---|---|---|---|---|---|---|
| ON | OFF | ON | ON | ON | ON | OFF | OFF | OFF | OFF | OFF | OFF | OFF | OFF | 3.5E |
| OFF | ON | ON | ON | ON | ON | OFF | OFF | OFF | OFF | OFF | OFF | OFF | OFF | 2.5E |
| OFF | OFF | OFF | ON | ON | ON | OFF | OFF | OFF | OFF | OFF | ON | OFF | OFF | 1.5E |
| OFF | ON | ON | ON | ON | OFF | ON | OFF | OFF | OFF | OFF | OFF | OFF | OFF | 0.5E |
| OFF | OFF | OFF | ON | ON | OFF | ON | OFF | OFF | OFF | OFF | ON | OFF | OFF | −0.5E |
| OFF | OFF | OFF | OFF | OFF | OFF | ON | ON | ON | OFF | OFF | OFF | ON | OFF | −1.5E |
| OFF | OFF | OFF | OFF | OFF | OFF | ON | ON | ON | ON | OFF | OFF | OFF | ON | −2.5E |
| OFF | OFF | OFF | OFF | OFF | OFF | ON | ON | ON | ON | ON | OFF | OFF | OFF | −3.5E |

Besides, the maximum voltages applied to the switching elements in the steady state is E similarly to the first and second embodiments.

In this fifth embodiment, the number of the levels of the phase voltages which can be outputted is increased. Accordingly, the number of the necessary switching elements is increased. However, the fifth embodiment has a configuration in which the flying capacitors which are common to the respective phases in the first embodiment are constructed as the multistage. Accordingly, it is possible to decrease the number of the diode elements without varying the number of the switching elements, relative to the conventional circuit system which has the same number of the phase voltage levels. Moreover, the number of the levels is increased. Accordingly, it is possible to decrease the harmonic (higher harmonic wave) of the output voltage and the current, and to decrease the size of the harmonic suppression filter.

Sixth Embodiment

Figure 9:
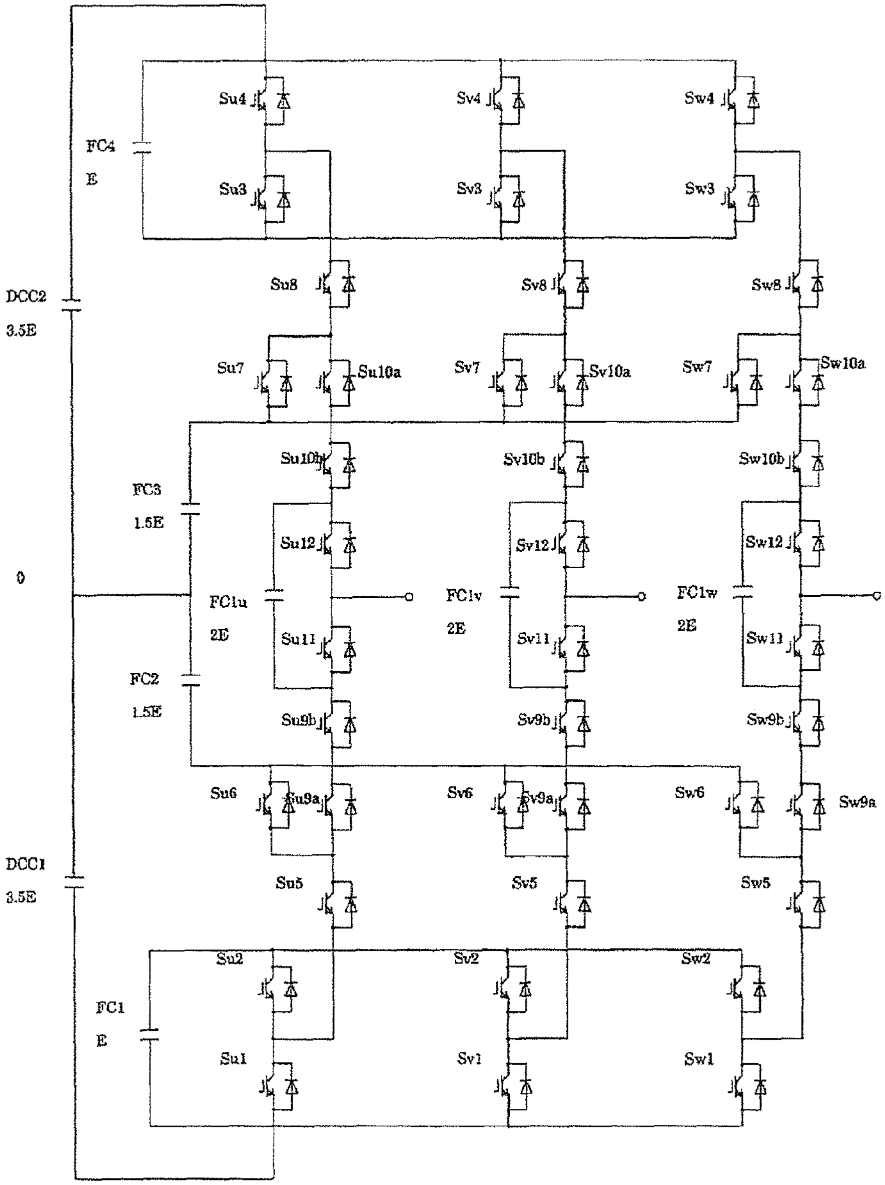
FIG. 9 is a circuit configuration view showing a multilevel power conversion device according to a sixth embodiment.

FIG. 9 shows a circuit configuration of a multilevel power conversion device according to the sixth embodiment.

Hereinafter, the circuit configuration of the multilevel power conversion device according to a sixth embodiment is illustrated. There are provided the direct current voltage sources DCC1 and DCC2, and the flying capacitors FC1, FC2, FC3, and FC4 which are common to the respective phases. By the phase modules provided to the respective phases, the voltages are selected, and outputted from the output terminals U, V, and W. The phase module in the U phase includes the switching elements Su1 to Su12, and the capacitor FC1*u*.

Hereinafter, the concrete circuit configuration of the U phase is illustrated as an example. The direct current voltage sources (the direct current capacitors or the direct current power sources) DCC1 and DCC2 are connected in series with each other. The common connection point (the neutral point) of these direct current voltage sources DCC1 and DCC2 is set to a terminal 0.

The negative electrode terminal of the flying capacitor FC1 is connected to the negative electrode terminal of the direct current voltage source DCC1. The positive electrode terminal of the flying capacitor FC2 and the negative electrode terminal of the flying capacitor FC3 are connected to the common connection point between the direct current voltage source DCC1 and the direct current voltage source DCC2. The positive electrode terminal of the flying capacitor FC4 is connected to the positive electrode terminal of the direct current voltage source DCC2.

The positive electrode terminal and the negative electrode terminal of the flying capacitor FC1, the negative electrode terminal of the flying capacitor FC2, the positive electrode terminal of the flying capacitor FC3, and the positive electrode terminal and the negative electrode terminal of the flying capacitor FC4 are connected to the phase modules as the input terminals.

One ends of the switching elements Su1 to Su4, Su6, and Su7 are connected to the input terminals. The other ends of the adjacent switching elements Su1 and Su2 are connected with each other. The other ends of the adjacent switching elements Su3 and Su4 are connected to each other. The one end of the switching element Su5 is connected to the common connection point between the adjacent switching elements Su1 and Su2. The one end of the switching element Su8 is connected to the common connection point between the adjacent switching elements Su3 and Su4. The other ends of the adjacent switching elements Su5 and Su6 are connected to each other. The other ends of the adjacent switching elements Su7 and Su8 are connected to each other. The one end of the switching element Su9*a* is connected to the common connection point between the adjacent switching elements Su5 and Su6. The one end of the switching element Su10*a* is connected to the common connection point between the adjacent switching elements Su7 and Su8. The switching elements Su11 and Su12 of the output stage are connected in series with each other in order between the other ends of the switching elements Su9*a* and Su10*a* of the final stage through the switching elements Su9*b* and Su10*b*. The capacitor FC1*u* is connected in parallel with the switching elements Su11 and Su12 of the output stage. The common connection point between the switching elements Su11 and Su12 of the output stages is set to the output terminal U.

By selectively controlling the respective switching elements of this phase module in an ON-OFF manner, it is possible to output the potential of one of the input terminals, or a potential obtained by adding or subtracting the voltage of the capacitor FC1*u* to or from the potential of one of the input terminals, from the output terminal U.

Besides, the V phase and W phase are similarly constructed.

By controlling the voltages of the direct current voltage sources DCC1 and DCC2 to 3.5E, controlling the voltages of the flying capacitors FC1 and FC4 to E, controlling the voltages FC2 and FC3 to 1.5E, and controlling the voltages the capacitors FC1*u*, FC1*v*, and FC1*w* to 2E, it is possible to output the phase voltages of 8 levels of 3.5E, 2.5E, 1.5E, 0.5E, −0.5E, −1.5E, −2.5E, and −3.5E from the output terminals U, V, and W. Besides, the reference point of the phase voltage is the terminal 0.

In this sixth embodiment, the number of the levels which can be outputted is increased. Accordingly, the number of the necessary switching elements is increased. However, the sixth embodiment has a configuration in which the flying capacitors which are common to the respective phases in the first embodiment are varied to the multistage. Accordingly, it is similarly possible to decrease the number of the diode elements without varying the number of the switching elements, relative to a case in which the conventional configuration of FIG. 29 is enlarged to the same number of the levels. Moreover, the number of the levels is increased. Accordingly, it is possible to suppress the output voltage and the current harmonics (higher harmonic wave), and to decease the size of the harmonics suppression filter, relative to the first to third embodiments.

Seventh Embodiment

Figure 10:
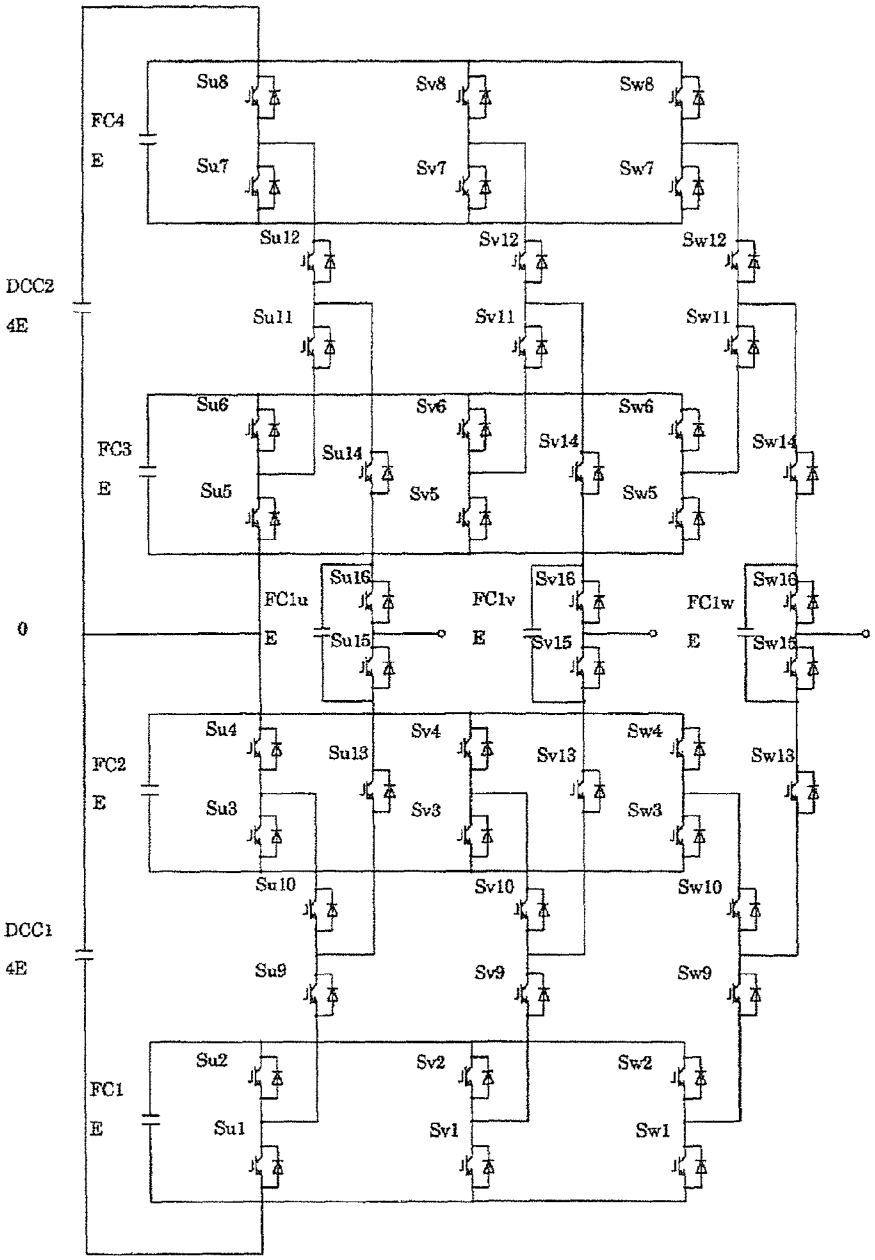
FIG. 10 is a circuit configuration view showing a multilevel power conversion device according to a seventh embodiment.

FIG. 10 shows a circuit configuration of a multilevel power conversion device according to a seventh embodiment.

Hereinafter, the circuit configuration of the multilevel power conversion device according to this seventh embodiment is illustrated. In the multilevel power conversion device according to the seventh embodiment, the flying capacitors FC1 and FC32 which are common to the respective phases in the multilevel power conversion device according to the first embodiment is varied to a four stages of FC1, FC2, FC3, and FC4. That is, the multilevel power conversion device includes the direct current voltage sources DCC1 and DCC2, and the flying capacitors FC1, FC2, FC3, and FC4 which are common to the respective phase. By the phase modules provided to the respective phases, the voltages are selected, and outputted from the output terminals U, V, and W. The phase module of U phase includes the switching elements Su1 to Su16, and the capacitors FC1*u*.

Hereinafter, a concrete circuit configuration of U phase is illustrated as an example. The direct current voltage sources (the direct current capacitors or the direct current power sources) DCC1 and DCC2 are connected in series with each other. The common connection point (the neutral point) between these direct current voltage sources DCC1 and DCC2 is set to the terminal 0.

The negative electrode of the flying capacitor FC1 is connected to the negative electrode terminal of the direct current voltage source DCC1. The positive electrode terminal of the flying capacitor FC2 is connected to the positive electrode terminal of the direct current voltage source DCC1. The negative electrode terminal of the flying capacitor FC3 is connected to the negative electrode terminal of the direct current voltage source DCC2. The positive electrode terminal of the flying capacitor FC4 is connected to the positive electrode terminal of the direct current voltage source DCC2.

The phase modules uses the positive electrode terminals and the negative electrode terminals of the flying capacitors FC1 to FC4 as the input terminals.

The one ends of the first switching elements Su1 to Su8 are connected to the respective input terminals. The other ends of the adjacent switching elements Su1 and Su2 are connected with each other. The other ends of the adjacent switching elements Su3 and Su4 are connected with each other. The other ends of the adjacent switching elements Su5 and Su6 are connected with each other. The other ends of the adjacent switching elements Su7 and Su8 are connected with each other. The one ends of the switching elements Su9 to Su12 are connected to the common connection point of the adjacent switching elements Su1 and Su2, the adjacent switching elements Su3 and Su4, the adjacent switching elements Su5 and Su6, and the adjacent switching elements Su7 and Su8. The other ends of the adjacent switching elements Su9 and Su10 are connected with each other. The other ends of the adjacent switching elements Su11 and Su12 are connected with each other. The switching elements Su13 and Su14 are connected with the common connection point between the adjacent switching elements Su9 and Su10, and the common connection point between the adjacent switching elements Su11 and Su12. The switching elements Su15 and Su16 of the output stage are connected in series with in order between the other ends of the switching elements Su13 and Su14 of the final stage. The capacitor FC1*u* is connected in parallel with the switching elements Su15 and Su16 of the output stage. The common connection point between the switching elements Su15 and Su16 of the output stage is set to the output terminal U.

By selectively controlling the respective switching elements of this phase module in the ON-OFF manner, it is possible to output the potential of one of the input terminals, or the potential obtained by adding or subtracting the voltage of the capacitor FC1*u* to or from the potential of the one of the input terminals, from the output terminal U.

Besides, the V phase and the W phase are similarly constituted.

By controlling the voltages of the direct current voltage sources DCC1 and DCC2 to 4E, controlling the voltages of the flying capacitors FC1, FC2, FC3, and FC4 to E, and controlling the voltages of the capacitors FC1*u*, FC1*v*, and FC1*w* to E, it is possible to output the phase voltages of 9 levels of 4E, 3E, 2E, 1E, 0, −1E, −2E, −3E, and −4E from the output terminals U, V, and W. Besides, the reference point of the phase voltage is set to 0.

A table 3 shows a typical switching pattern in this seventh embodiment.

TABLE 3

| Su8 | Su12 | Su14 | Su16 | Su15 | Su13 | Su9 | Su1 | Su7 | Su11 | Su6 | Su5 | Su4 | Su3 | Su10 | Su2 | U |
|---|---|---|---|---|---|---|---|---|---|---|---|---|---|---|---|---|
| ON | ON | ON | ON | OFF | OFF | OFF | OFF | OFF | OFF | OFF | OFF | OFF | OFF | OFF | OFF | 4E |
| OFF | ON | ON | ON | OFF | OFF | OFF | OFF | ON | OFF | OFF | OFF | OFF | OFF | OFF | OFF | 3E |
| OFF | ON | ON | OFF | ON | OFF | OFF | OFF | ON | OFF | OFF | OFF | OFF | OFF | OFF | OFF | 2E |
| OFF | OFF | ON | ON | OFF | OFF | OFF | OFF | OFF | ON | ON | OFF | OFF | OFF | OFF | OFF | E |
| OFF | OFF | ON | ON | OFF | OFF | OFF | OFF | OFF | ON | OFF | ON | OFF | OFF | OFF | OFF | 0 |
| OFF | OFF | OFF | OFF | ON | ON | OFF | OFF | OFF | OFF | OFF | OFF | OFF | ON | ON | OFF | −E |
| OFF | OFF | OFF | ON | OFF | ON | ON | OFF | OFF | OFF | OFF | OFF | OFF | OFF | OFF | ON | −2E |
| OFF | OFF | OFF | OFF | ON | ON | ON | OFF | OFF | OFF | OFF | OFF | OFF | OFF | OFF | ON | −3E |
| OFF | OFF | OFF | OFF | ON | ON | ON | ON | OFF | OFF | OFF | OFF | OFF | OFF | OFF | OFF | −4E |

In the seventh embodiment, the number of the levels which can be outputted is increased. Accordingly, the number of the necessary switching elements are increased. However, the seventh embodiment has a configuration in which the fling capacitors which are common to the respective phases in the first embodiment are varied to the multistage. Accordingly, it is similarly possible to decrease the number of the diode elements without varying the number of the switching elements, relative to a case in which FIG. 29 of the conventional configuration is enlarged to the same number of the levels. Moreover, the number of the levels is increased. Accordingly, it is possible to suppress the output voltage and the current harmonics, and to decrease the size of the harmonic suppression filter, relative to the first to third embodiments.

Eighth Embodiment

Figure 11:
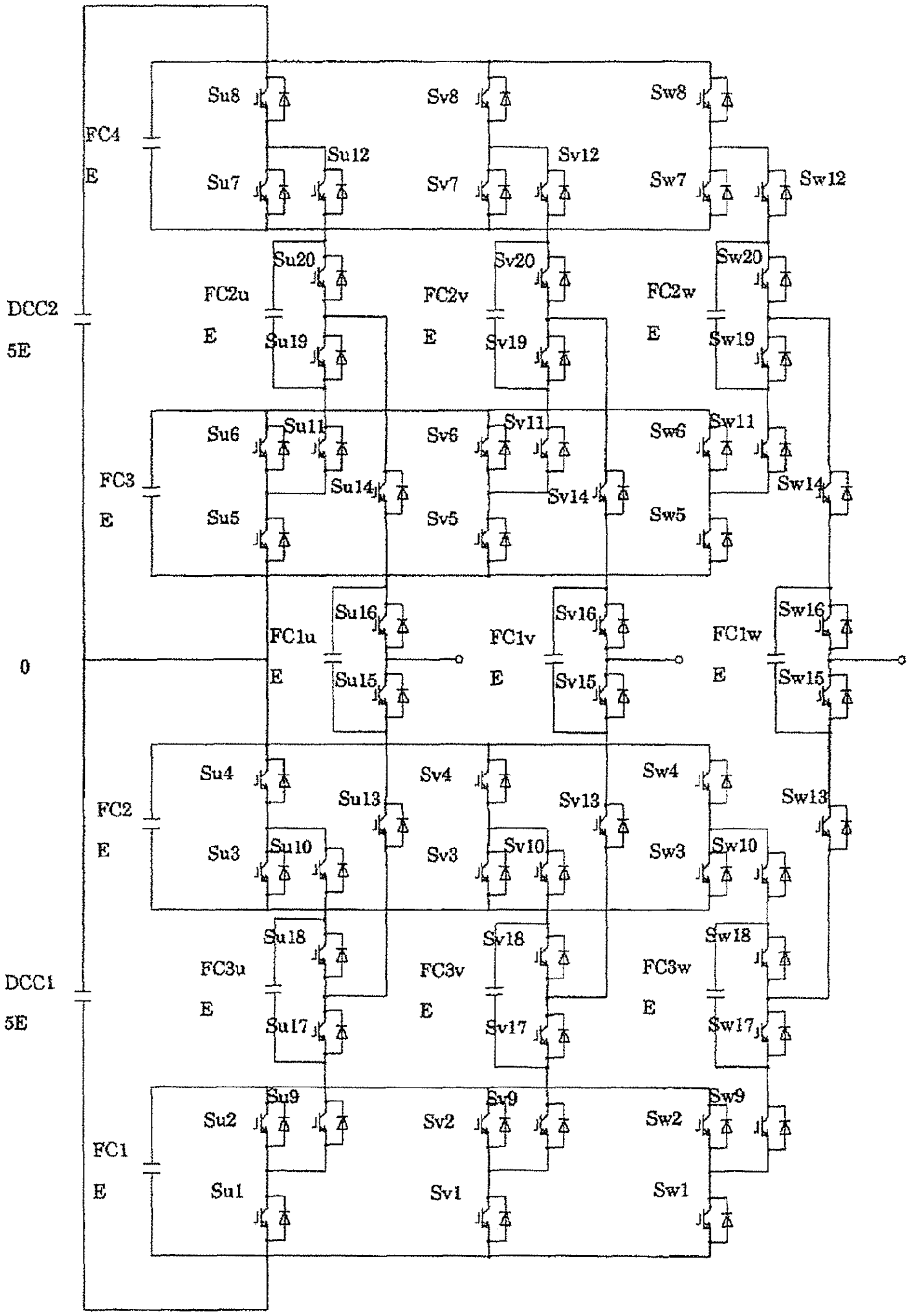
FIG. 11 is a circuit configuration view showing a multilevel power conversion device according to an eighth embodiment.

FIG. 11 shows a circuit configuration of a multilevel power conversion device according to an eighth embodiment.

Hereinafter, the circuit configuration of the multilevel power conversion device according to the eighth embodiment is illustrated. In the multilevel power conversion device according to the eighth embodiment, switching elements Su17, Su18, Su19, and Su20 are disposed between the switching elements Su9 and Su10, and Su11 and Su12 in the multilevel power conversion device according to the seventh embodiment. A capacitor as FC3*u* is connected in parallel with the switching elements Su17 and Su18. A capacitor FC2*u* is connected in parallel with the switching elements Su19 and Su20. The one ends of the switching elements Su13 and Su14 of the next stage are connected to the common connection point between the switching elements Su17 and Su18, and the common connection point between the switching elements Su19 and Su20. That is, in the eighth embodiment, there is provided a parallel connection circuit of the switching element and the capacitor, in addition to the switching element of the final stage.

In the phase module, by selectively controlling the respective switching elements in the ON-OFF manner, the potential of one of the input terminals, or the potential obtained by adding or subtracting the voltages of the capacitors FC1*u*, FC2*u*, and FC3*u* to or from the potential of one of the input terminals is outputted.

Besides, the V phase and the W phase are similarly constituted.

By controlling the voltages of the direct current voltage sources DCC1 and DCC2 to 5E, controlling the voltages of the flying capacitors FC1, FC2, FC3, and FC4 to E, and controlling the voltages of the capacitors FC1*u*, FC2*u*, FC3*u*, FC1*v*, FC2*v*, FC3*v*, FC1*w*, FC2*w*, and FC3*w* to E, it is possible to output the phase voltages of 11 levels of 5E, 4E, 3E, 2E, E, 0, −E, −2E, −3E, −4E, and −5E. Besides, the reference point of the phase voltage is set to the terminal 0. A table 4 shows a typical switching pattern of the U phase.

TABLE 4

| Su8 | Su12 | Su20 | Su14 | Su16 | Su15 | Su13 | Su17 | Su9 | Su1 | Su7 | Su19 | Su11 | Su6 | Su5 | Su4 | Su3 | Su10 | Su18 | Su2 | U |
|---|---|---|---|---|---|---|---|---|---|---|---|---|---|---|---|---|---|---|---|---|
| ON | ON | ON | ON | ON | OFF | OFF | OFF | OFF | OFF | OFF | OFF | OFF | OFF | OFF | OFF | OFF | OFF | OFF | OFF | 5E |
| OFF | ON | ON | ON | ON | OFF | OFF | OFF | OFF | OFF | ON | OFF | OFF | OFF | OFF | OFF | OFF | OFF | OFF | OFF | 4E |
| OFF | ON | OFF | ON | ON | OFF | OFF | OFF | OFF | OFF | ON | ON | OFF | OFF | OFF | OFF | OFF | OFF | OFF | OFF | 3E |
| OFF | OFF | ON | ON | ON | OFF | OFF | OFF | OFF | OFF | OFF | OFF | ON | ON | OFF | OFF | OFF | OFF | OFF | OFF | 2E |
| OFF | OFF | OFF | ON | ON | OFF | OFF | OFF | OFF | OFF | OFF | ON | ON | ON | OFF | OFF | OFF | OFF | OFF | OFF | E |
| OFF | OFF | OFF | ON | OFF | OFF | OFF | OFF | OFF | OFF | OFF | ON | ON | OFF | ON | OFF | OFF | OFF | OFF | OFF | 0 |

TABLE 4-continued

| Su8 | Su12 | Su20 | Su14 | Su16 | Su15 | Su13 | Su17 | Su9 | Su1 | Su7 | Su19 | Su11 | Su6 | Su5 | Su4 | Su3 | Su10 | Su18 | Su2 | U |
|---|---|---|---|---|---|---|---|---|---|---|---|---|---|---|---|---|---|---|---|---|
| OFF | OFF | OFF | OFF | OFF | ON | ON | OFF | OFF | OFF | OFF | OFF | OFF | OFF | OFF | OFF | ON | ON | ON | OFF | −E |
| OFF | OFF | OFF | OFF | OFF | ON | ON | ON | OFF | OFF | OFF | OFF | OFF | OFF | OFF | OFF | ON | ON | OFF | OFF | −2E |
| OFF | OFF | OFF | OFF | OFF | ON | ON | OFF | ON | OFF | OFF | OFF | OFF | OFF | OFF | OFF | OFF | OFF | OFF | ON | −3E |
| OFF | OFF | OFF | OFF | OFF | ON | ON | ON | ON | OFF | OFF | OFF | OFF | OFF | OFF | OFF | OFF | OFF | OFF | ON | −4E |
| OFF | OFF | OFF | OFF | OFF | ON | ON | ON | ON | ON | OFF | OFF | OFF | OFF | OFF | OFF | OFF | OFF | OFF | OFF | −5E |

In the eighth embodiment, the number of the diode element is 0, similarly to the seventh embodiment. Moreover, the number of the levels are increased. Accordingly, relative to the seventh embodiment, it is possible to suppress the output voltage and the current higher harmonics wave, and to decrease the size of the higher harmonics wave filter.

Ninth Embodiment

Figure 12:
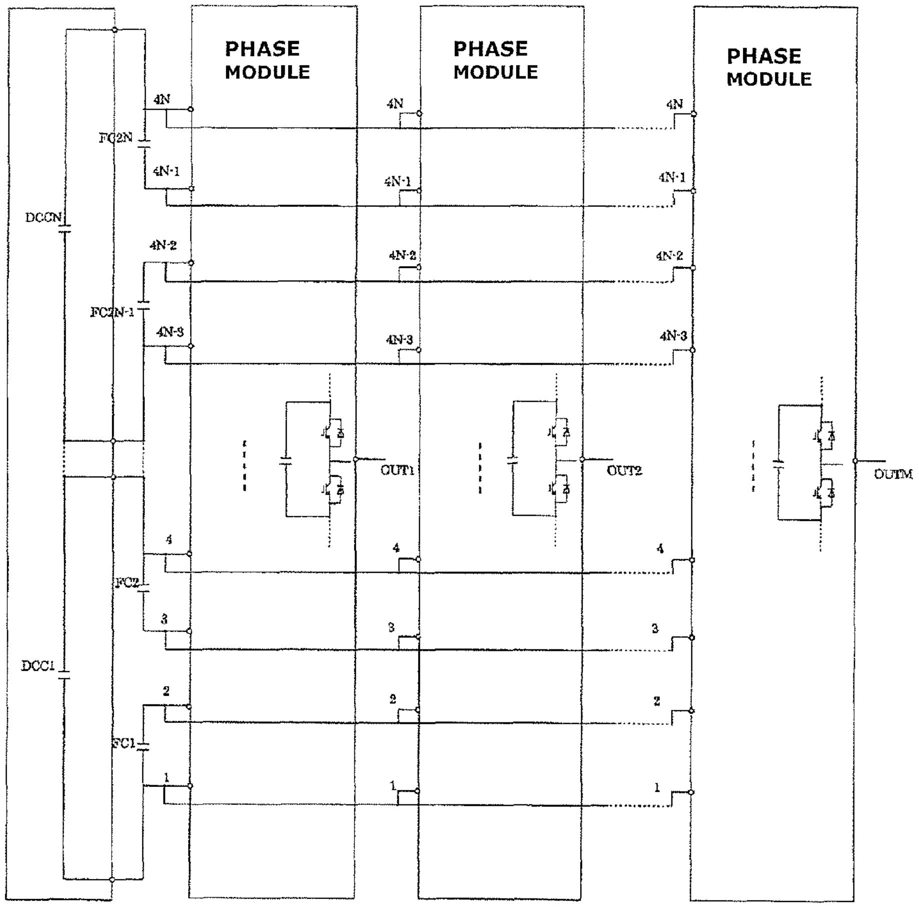
FIG. 12 is a circuit configuration view showing a multilevel power conversion device according to a ninth embodiment.

FIG. 12 shows a multilevel power conversion device according to a ninth embodiment.

FIG. 12 is a multilevel power conversion device in which a circuit of one phase of the multilevel power conversion device according to the first embodiment is enlarged to M phase and N stage. The stage number N (N=1, 2, 3 . . . ) is the number of the direct connections of the direct current power sources which are connected in series with each other. The direct current voltage sources DCC1 to DCCN are connected in series with each other.

The negative electrode terminals of the flying capacitors FC1, FC3, . . . , and FC2N−1 are connected, respectively, to the negative electrode terminals of this direct current voltage sources DCC1 to DCCN. The positive electrode terminals of the flying capacitors FC2, FC4, . . . , and FC2N are connected to the positive electrode terminals of the direct current voltage sources DCC1 to DCCN.

Figure 13:
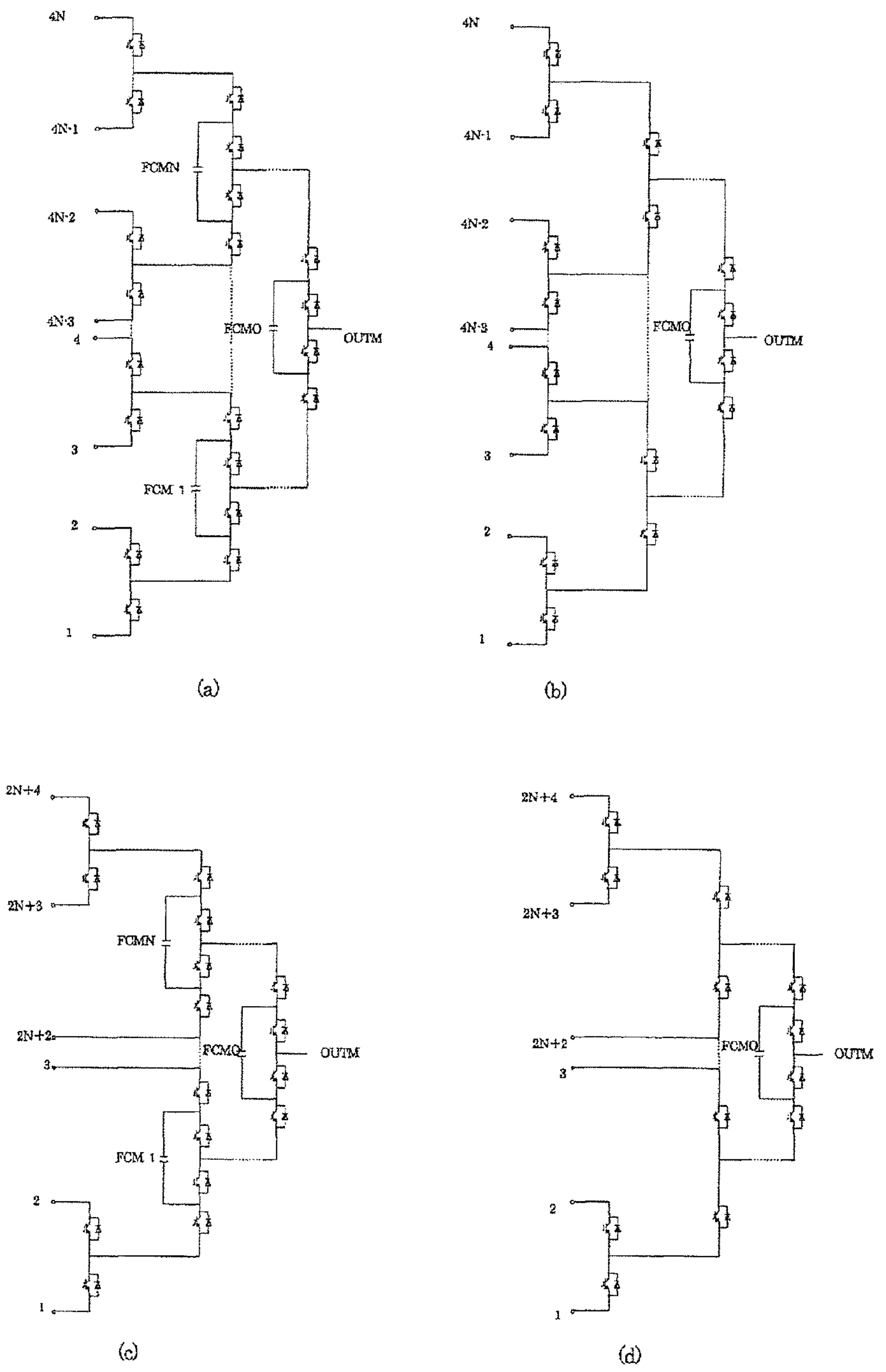
FIG. 13 are schematic views showing phase modules.

FIG. 13 shows an example of a configuration of a phase module used in a multilevel power conversion device according to this ninth embodiment. As shown in FIGS. 13(*a*) to (*d*), in all of (a) to (d), flying capacitors FCM0 of the respective phases are provided in parallel to the switching elements of the output stage. FIGS. 13(*a*) and (*b*) show an example of configuration in which the number of the input terminals of the phase module is a multiple of 4. FIGS. 13(*c*) and (*d*) shows an example of a configuration in which the number of the input terminals of the phase module is an even number except for the multiple of 4. A difference between FIG. 13(*a*) and FIG. 13(*b*) and a difference between FIG. 13(*c*) and FIG. 13(*d*) is to have the capacitors FCM1 to FCMN except for the capacitor FCM0 connected in parallel with the switching elements of the output stage.

As shown in FIG. 12, the circuit of the ninth embodiment has the 4N of the number of the input terminals of the phase modules which is the multiple of 4. Accordingly, FIG. 13(*a*) or FIG. 13(*b*) is selected. The input terminals of the phase module are connected to the positive or negative electrode terminals of the flying capacitors FC1 to FC which are common to the respective phases.

Moreover, the number of the level of the phase voltage is dependent on the sorts (kinds) of the phase modules which are applied, and the applying voltages of the direct current voltage sources DCC1 to DCCN, the flying capacitors FC1 to FC2N which are common to the respective phases, and the applying voltages of the respective capacitors FCM0, FCM1 to FCMN within the phase module. In a case where the phase module of FIG. 13(*b*) is used, by controlling the voltages of the direct current voltage sources DCC1 to DCCN of FIG. 12 to 4E, and controlling the flying capacitors FC1 to FC2N and the flying capacitors FCM0 of the phase module of FIG. 13(*b*) to E, the number of the levels of the phase voltages becomes (4N+1).

The first embodiment is a case in which N=1 and N=3 are set in the ninth embodiment, and the phase module of FIG. 13(*b*) is applied. The seventh embodiment is a case in which N=2 and M=3 are set in the ninth embodiment, and the phase module is applied, the voltages of the direct current voltage sources DCC1 to DCCN of FIG. 12 are controlled to 4E, the voltages of the flying capacitors FC1 to FC2N of FIG. 12, and the voltage of the capacitor FCM0 of the phase module is controlled to E. The second embodiment is a case where N=1 and M=3 is set in the ninth embodiment, where the phase module of FIG. 13(*b*) is applied, and where the voltages of the direct current voltage sources DCC1 to DCCN are controlled to 5E, the voltages of the flying capacitors FC1 to FC2N are controlled to E, and the voltage of the capacitor FCM0 of the phase module of FIG. 13 is controlled to 2E. The eighth embodiment is a case where N=2 and M=3 are set in the eighth embodiment, where the phase module of FIG. 13(*a*) is applied, and where the voltages of the direct current voltage sources DCC1 to DCCN of FIG. 12 are controlled to 5E, and the voltages of the capacitors FCM0, FCM1 to FCMN are controlled to E.

Besides, the respective direct current sources DCC1 to DCCN may be divided.

Tenth Embodiment

Figure 14:
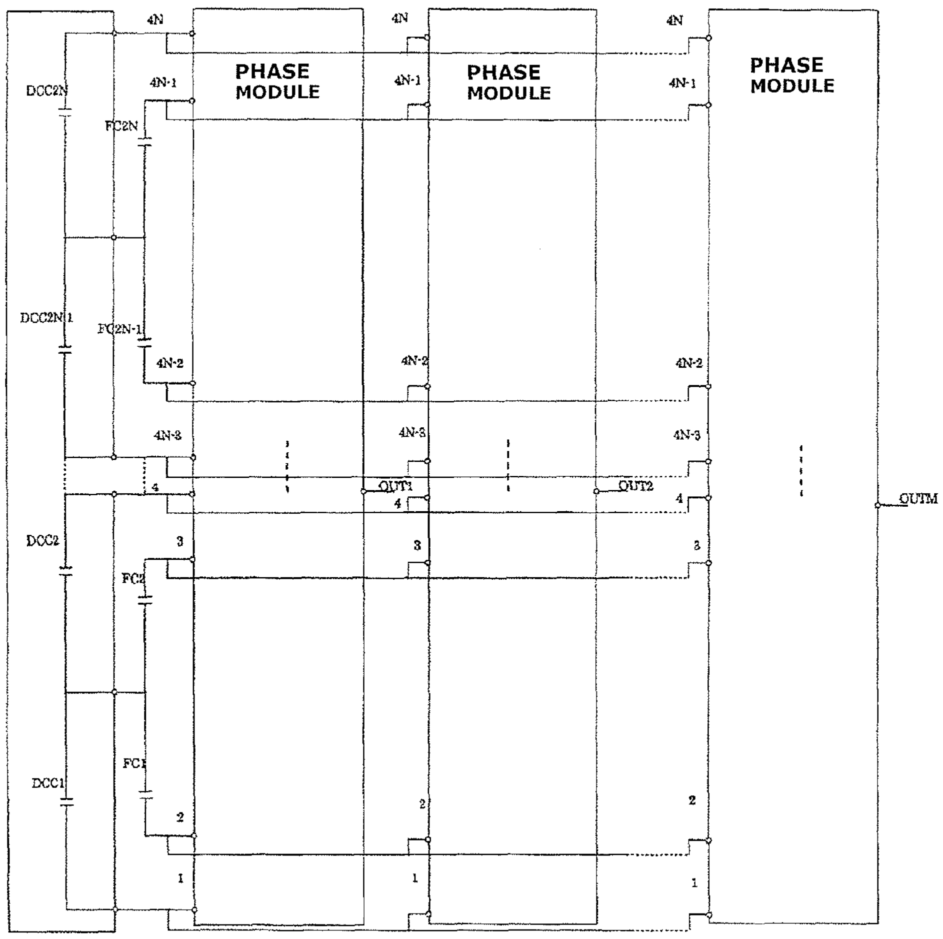
FIG. 14 is a circuit configuration view showing a multilevel power conversion device according to a tenth embodiment.

FIG. 14 shows a multilevel power conversion device according to a tenth embodiment.

The multilevel power conversion device according to the tenth embodiment is different in the connection configuration of the flying capacitors FC1 to FC2N from the ninth embodiment.

2N is the number of the direct connections in which the direct current voltage source are connected with each other. The direct current voltage sources DCC1 to DCC2N are connected in series. Moreover, the number of the flying capacitors FC1 to FC2N is 2N. The positive electrode terminals of the first flying capacitors FC1, FC3, . . . , and FCn−1 are connected to the common connection points between the respective direct current voltage sources DCCn (n: odd number) and DCCn+1 (n+1: even number). The negative electrode terminals of the flying capacitors FC2, FC4, and FC2N are connected to the common connection points between the respective direct current voltage sources DCCn (n: odd number) and DCCn+1 (n+1: even number).

Accordingly, in the tenth embodiment, the number of the direct connection of the direct current voltage sources DCC1 to DCC2N and the number of the flying capacitors FCC1 to FCC2N which are common to the respective phases are the even number. Besides, M≥2 is set.

The phase module uses, as the input terminals, the negative electrode terminals of the direct current voltage sources DCCn (n: odd number), the negative electrode terminals of the flying capacitors FCn, the positive electrode terminals of the direct current voltage sources DCCn+1, and the positive electrode terminals of the flying capacitors FCn+1.

The number of the levels of the phase voltage is dependent on the sort (kind) of the applied phase module, and the applying voltages of the direct current voltage sources DCC1 to DCCN, the flying capacitors FC1 to FC2N which are common to the respective phases, and the capacitors of the respective phases within the phase module. By controlling the voltages of the direct current voltage sources DCC1 to DCC2N of FIG. 14 to 2E, controlling the voltages of the flying capacitors FC1 to FC2N which are common to the respective phases, and the voltage of the capacitor FCM0 of the phase module which are shown in FIG. 13(*b*) to E, the number of the levels of the phase voltages becomes (4N+1).

The forth embodiment is a case where N=1 and M=3 are set in the ninth embodiment, where the phase module of FIG. 13(*b*) is selected, where the voltages of the direct current voltage sources DCC1 to DCCN of FIG. 14 are controlled to 2E, where the voltage of the flying capacitors FC1 to FC2N are controlled to E, and where the voltage of the capacitor FCM0 of the phase module of FIG. 13 is controlled to E.

Besides, the direct current voltage sources DCC1 to DCC2N may be respectively divided.

Eleventh Embodiment

Figure 15:
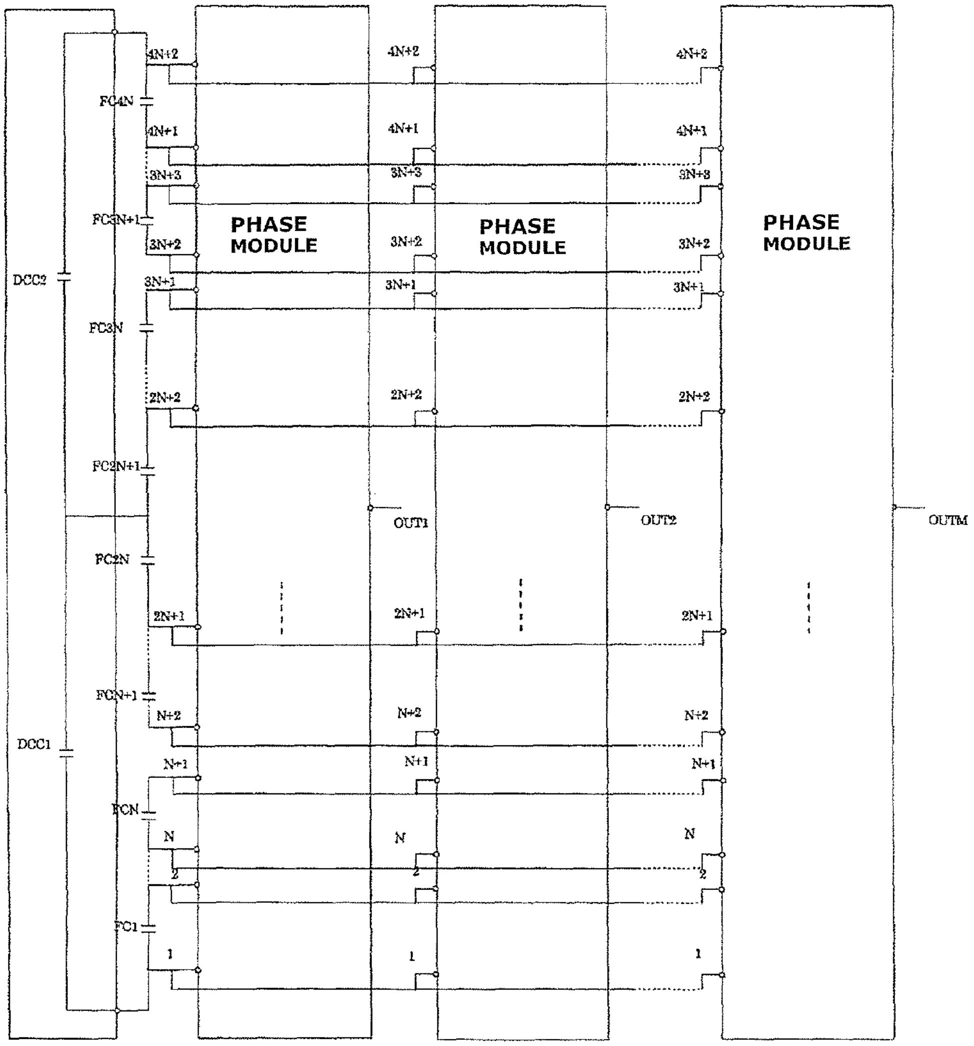
FIG. 15 is a circuit configuration view showing a multilevel power conversion device according to an eleventh embodiment.

FIG. 15 shows a multilevel power conversion device according to an eleventh embodiment.

The direct current voltage sources DCC1 and DCC2 are connected in series with each other.

The connection configuration of the flying capacitors FC1 to FC4N are different from the ninth embodiment and the tenth embodiment. The negative electrode terminals of the flying capacitors FC1 to FCN are connected in order in series with the negative electrode terminal of the direct current power source DCC1. The positive electrode terminals of the flying capacitors FC2N to FCN+1 are connected in order in series with the common connection point between the direct current voltage sources DCC1 and DCC2. The negative electrode terminals of the flying capacitors FC2N+1 to FC3N are connected in this order in series with the common connection point between the direct current voltage sources DCC1 and DCC2. The positive electrode terminals of the flying capacitors FC4N to FC3N+1 are connected in order in series with the positive electrode terminal of the direct current voltage source DCC2.

The phase module uses, as the input terminals, the positive electrode terminal and the negative electrode terminal of the flying capacitor FC1, the positive electrode terminals of the flying capacitors FC2 to FCN, the negative electrode terminals of the flying capacitors FCN+1 to FC2N, the positive electrode terminals of the flying capacitors FC2N+1 to FC3N, the negative electrode terminals of the flying capacitors FC3N+1 to FC4N−1, and the positive electrode terminal and the negative electrode terminal of the flying capacitor FC4N.

4N is the number of the flying capacitors. Accordingly, the number of the flying capacitors FC1 to FC4N is multiples of 4 in the first embodiment. Besides, M≥2 is set.

In the eleventh embodiment, 4N+2 of the number of the input terminals of the phase module is the even number which is not the multiples of 4. The phase module shown in FIGS. 13(*c*) and (*d*) are applied.

Moreover, the number of the levels of the output phase voltages is dependent on the sorts (kinds) of the applied phase module, the applying voltages of the direct current power sources DCC1 to DCC2, the flying capacitors FC1 to FC4N which are common to the respective phases, and the capacitors FCM0, FCM1 to FCMN within the phase modules.

The sixth embodiment is an example in which N=1 and M=3 are set in this eleventh embodiment, in which the phase module of FIG. 13(*d*) is used, in which the voltages of the direct current voltage sources DCC1 to DCCN is controlled to 3.5E, in which the voltages of the flying capacitors FC1 and FC4N are controlled to E, in which the voltages of the flying capacitors FC2N and FC2N+1 are controlled to 1.5 E, and in which the voltages of the capacitor FCM0 of the phase module of FIG. 13 is controlled to 2E.

Besides, the direct current voltage sources DCC1 to DCC2 may be respectively divided.

Twelfth Embodiment

Figure 16:
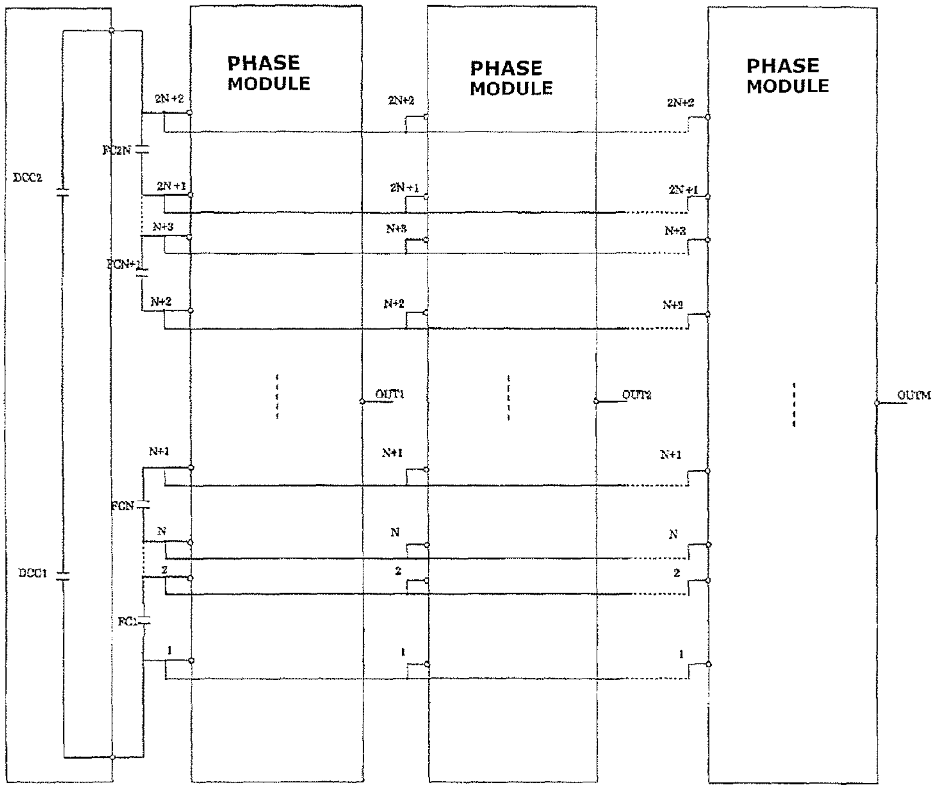
FIG. 16 is a circuit configuration view showing a multilevel power conversion device according to a twelfth embodiment.

FIG. 16 shows a multilevel power conversion device according to a twelfth embodiment.

The direct current voltage sources DCC1 and DCC2 are connected in series with each other.

The twelfth embodiment is a M phase N stage multilevel conversion device in which the flying capacitors FC1 to FC2N are common to the M phase. This is different from the ninth to eleventh embodiments in the connection configuration of the flying capacitors FC1 to FC2N.

The negative electrode terminals of the flying capacitors FC1 to FCN are connected in order in series with the negative electrode terminal of the direct current voltage source DCC1. The positive terminals of the flying capacitors FC2N to FCN+1 are connected in order in series with the positive electrode terminal of the direct current voltage source DCC2.

2N is the number of the flying capacitors FC1 to FC2N. Accordingly, in this structure, the number of the flying capacitors FC1 to FC2N is the even number. Besides, M≥2 is set.

The phase module uses, as the input terminals, the positive electrode terminal and the negative electrode terminal of the flying capacitor FC1, the positive electrode terminals of the flying capacitors FC2 to FCN, the negative electrode terminals of the flying capacitors FCN+1 to FC2N−1, and the positive electrode terminal and the negative electrode terminal of the flying capacitors FC2N.

In this twelfth embodiment, there is a case where the number (2N+2) of the input terminals of the phase module does not become the multiples of 4. In a case where the number (2N+2) of the input terminals of the phase module is the multiples of 4, the phase module shown in FIGS. 13(*a*) and (*b*) are applied. In a case where the number (2N+2) is the even number which is not the multiples of 4, the phase modules which corresponds to the number of the input terminals as shown in FIGS. 13 (*c*) and (*d*) is applied.

Moreover, the number of the levels of the phase voltage is dependent on the sort (kind) of the applied phase module, and the applying voltages of the direct current voltage sources DCC1 to DCC2, the flying capacitors FC1 to FC4N, and the capacitors within the phase module.

The fifth embodiment is an example in which the N=2 and M=3 are set in FIG. 16, in which the phase module of FIG. 13(*d*) is used, in which the voltages of the direct current voltage sources DCC1 to DCCN are controlled to 3.5E, in which the voltages of the flying capacitors FC1 to FC2N is controlled to E, and in which the voltage of the capacitor FCM0 of the phase module of FIG. 13 is controlled to 2E.

Besides, the direct current voltage sources DCC1 so to DCC2 may be respectively divided. Besides, the direct current voltage sources DCC1 and DCC2 may be integrated to one direct current voltage source.

Thirteenth Embodiment

Figure 17:
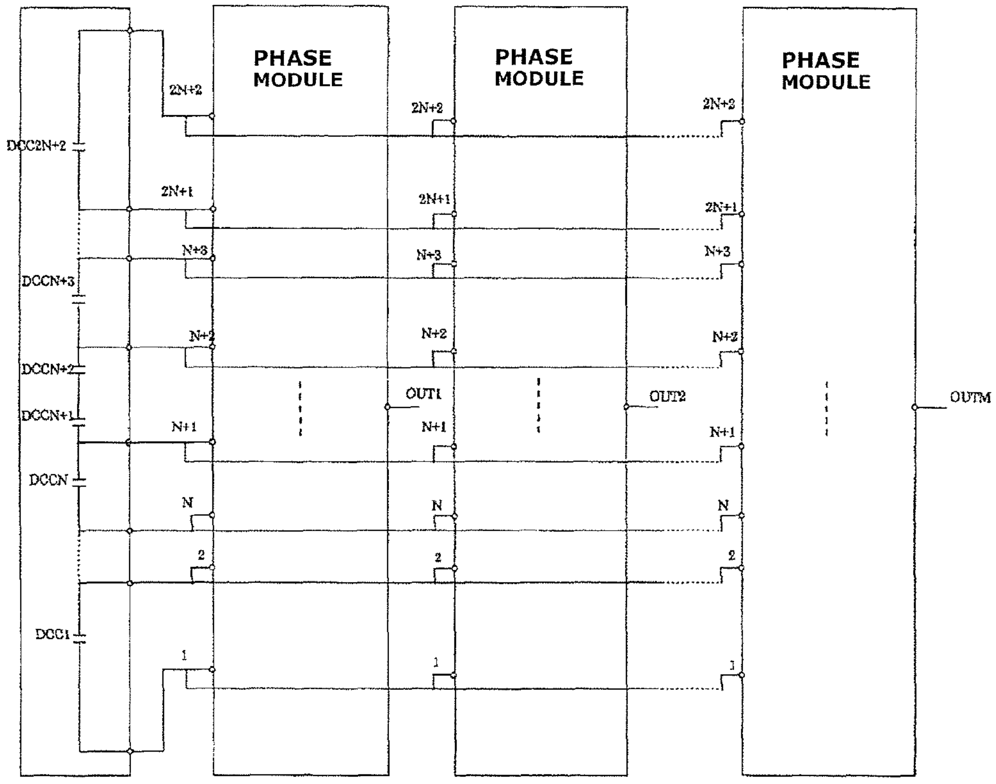
FIG. 17 is a circuit configuration view showing a multilevel power conversion device according to a thirteenth embodiment.

FIG. 17 shows a multilevel power conversion device according to a thirteenth embodiment.

FIG. 17 is a multilevel conversion device (N=1, 2, 3, . . . ) in which the direct current voltage sources which are common in the M phase are divided to (2N+2) number. That is, the direct current voltage sources DCC1 to DCC2N+2 are connected in series with each other.

The input terminals of the phase modules are connected to the direct current voltage sources DCC1 to DCC2N+2. Specifically, the positive electrode terminals and the negative electrode terminals of the direct current voltage sources DCC1 and DCC2N+2, the positive electrode terminals of the direct current voltage source DCC2 to DCCN, and the negative electrode terminals of the direct current voltage sources DCCN+3 to DCC2N+1 are used as the input terminals. That is, the only connection point between the direct current voltage sources DCCN+1 and DCCN+2 in the common connection points of the direct current voltage sources is not connected to the phase module. Besides, M≥2 is set.

In the case the thirteenth embodiment, there is a case where the input terminal number 2N+2 of the phase module does not become the multiples of 4. In a case where the input terminal number 2N+2 of the phase module is the multiples of 4, the phase module shown in FIGS. 13(*a*) and (*b*) are applied. In a case where the input terminal number 2N+2 of the phase module is the even number which is not the multiples of 4, the phase module which corresponds to the input terminal number as shown in FIGS. 13(*a*) and (*b*).

The number of the levels of the phase voltages is dependent on the sorts (kinds) of the applied phase module, and the applied voltages of the direct current voltage sources DCC1 to DCC2N+2 and the capacitors within the phase modules.

The third embodiment is an example where N=1 and M=3 are set in FIG. 17, where the phase module of FIG. 13(*b*) is used, where the voltages of the direct current voltage sources DCC1 to DCC2N are set to E, and where the voltage of the capacitor FCM0 of the phase module of FIG. 13 is controlled to E.

Besides, the direct current voltage sources DCC1 to DCC2N+2 may be respectively divided. Moreover, the direct current voltage sources DCCN+1 and DCCN+2 may be integrated into one direct current voltage source.

Fourteenth Embodiment

Figure 18:
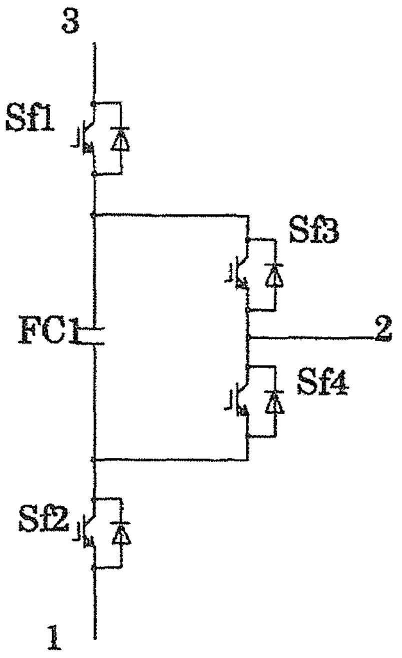
FIG. 18 is a circuit configuration diagram showing a structure of a basic cell.

FIG. 18 shows a basic cell used in multilevel power conversion devices according to fourteenth to seventeenth embodiments. The basic cell includes a flying capacitor FC1 and semiconductor elements (for example, IGBT) Sf1, Sf2, Sf3, and Sf4. These are common in the M phase. Hereinabove, there are provided the basic cell which is common in the phases. With this, it is possible to decrease the number of the used switching elements (including the semiconductor elements).

The terminal 3 is connected to the positive electrode of the direct current voltage source (the capacitor or the direct current source). The terminal 1 is connected to the negative electrode of the direct current voltage source (the capacitor or the direct current power source). The terminal 2 is connected to the phase module. The phase module is illustrated later.

Figure 19:
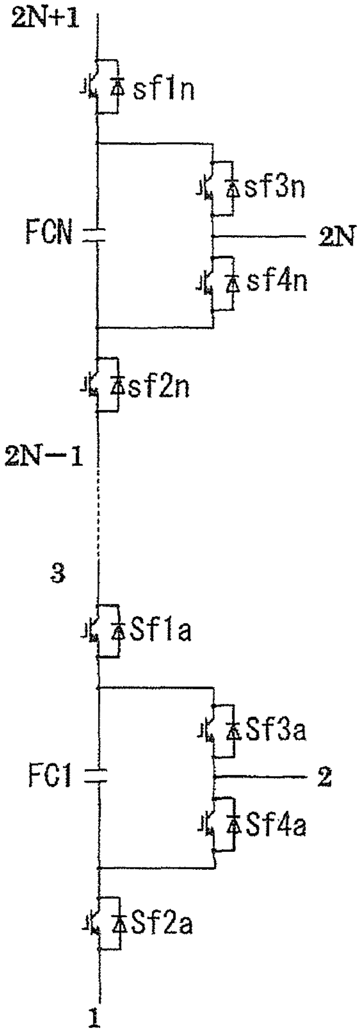
FIG. 19 is a circuit configuration diagram showing a circuit in which the basic cells are connected in series to each other.

FIG. 19 shows a configuration in which N number of the basic cells are connected in series with each other. In this case, N≥2 is set. The direct current voltage source (the capacitor or the direct power source) is connected to the terminals 2N+1 and 2N−1. The phase module is connected to the terminal 2N.

Figure 20:
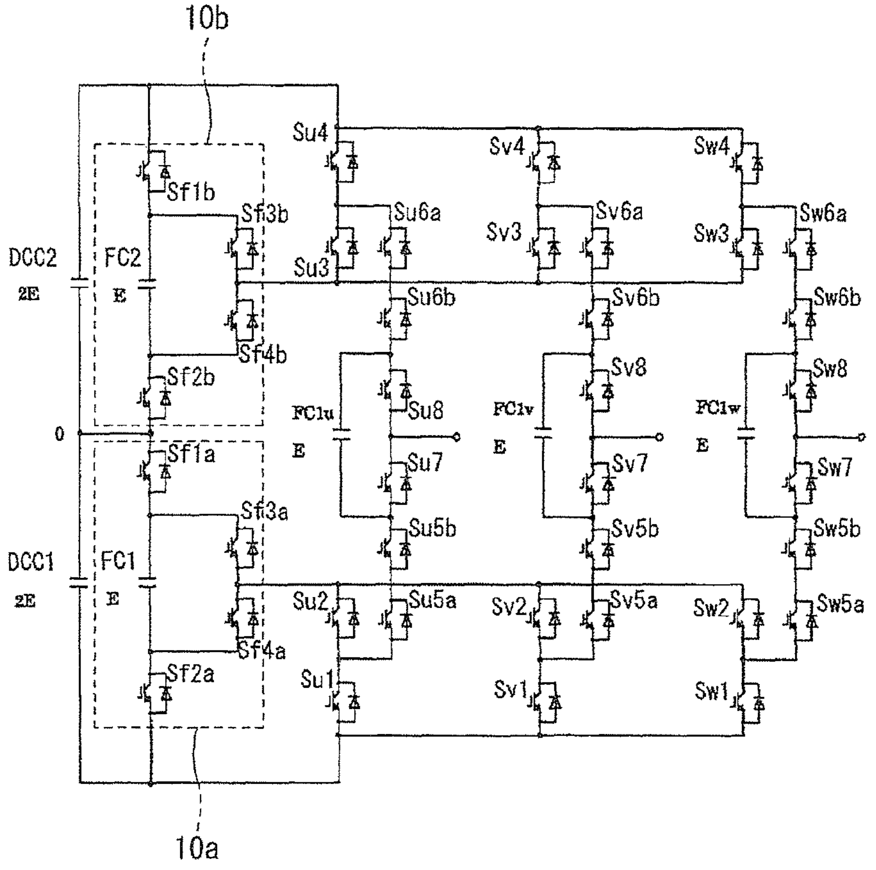
FIG. 20 is a circuit configuration view showing a multilevel power conversion device according to a fourteenth embodiment.

FIG. 20 shows a circuit configuration of a multilevel power conversion device according to a fourteenth embodiment in which the basic cells of FIG. 19 are used.

Hereinafter, a circuit configuration of a multilevel power conversion device according to the fourteenth embodiment is illustrated with reference to FIG. 20. The multilevel power conversion device according to the fourteenth embodiment includes the direct power sources DCC1 and DCC2 which are common to the respective phases, and the first and second basic cells 10*a* and 10*b*. By the phase modules provided to the respective phases, the voltage is selected, and outputted from the output terminals U, V, and W.

Hereinafter, a concrete circuit configuration of U phase is illustrated as an example. The direct current voltage sources (the direct current capacitors or the direct current power sources) are connected in series with each other. The common connection point (the neutral point) between these direct current voltage sources DCC1 and DCC2 is set to the terminal 0.

The first and second basic cells 10*a* and 10*b* include, respectively, semiconductor elements Sf1*a* and Sf1*b* which have one ends connected to the positive electrode terminals of the respective direct current voltage sources DCC1 and DCC2; semiconductor elements Sf2*a* and Sf2*b* which have one ends connected to the negative electrode terminals of the respective direct current voltage sources DCC1 and DCC2; flying capacitors FC1 and FC2 which are connected between the other ends of the semiconductor elements Sf1*a* and Sf1*b*, and the other ends of the semiconductor elements Sf2*a* and Sf2*b*; and semiconductor elements Sf3*a*, Sf4*a*, Sf3*b*, and Sf4*b* which are connected in series between the common connection points between the semiconductor elements Sf1*a* and Sf1*b* and the flying capacitors FC1 and FC2, and the common connection points between the semiconductor elements Sf2*a* and Sf2*b* and the flying capacitors FC1 and FC2. The basic cells 10*a* and 10*b* output the voltages of E and −E levels to the phase modules by switching the semiconductor elements Sf1*a* and Sf1*b*, and Sf4*a* and Sf4*b*, or Sf2*a* and Sf2*b*, and Sf3*a* and Sf3*b* to the ON state.

The one end of the semiconductor element Sf2*a*, the common connection point between the semiconductor element Sf3*a* and Sf4*a*, the common connection point between the semiconductor elements Sf3*b* and Sf4*b*, and the one end of the semiconductor element Sf1*b* are connected to the respective phase modules as the input terminals.

The one ends of the switching elements Su1 to Su4 are connected to the input terminals. The other ends of the adjacent switching elements Su1 and Su2, and Su3 and Su4 are connected with each other. The one ends of the switching elements Su5*a* and Su6*a* are connected to the common connection point between the adjacent switching elements Su1 and Su2, and the common connection point between the adjacent switching elements Su3 and Su4. The switching elements Su7 and Su8 of the output stage are connected in order in series between the other ends of the switching elements Su5*a* and Su6*a* of the final stage through the switching elements Su5*b* and Su6*b*. The capacitor FC1*u* is connected in parallel to the switching elements Su7 and Su8 of the output stage. The common connection point between the switching elements Su7 and Su8 of the output stage is set to output terminal U. Besides, the switching elements Su5*b* and Su6*b* are connected in series with the switching elements Su5*a* and Su6*a* for the withstand voltage.

By selectively controlling the switching elements of the phase module in the ON-OFF manner, it is possible to output the potential of one of the input terminals, or the potential obtained by adding or subtracting the voltage of the capacitor FC1*u* to or from the potential of the one of the input terminals from the output terminal U.

Besides, the V phase and the W phase are similarly constituted.

Figure 21:
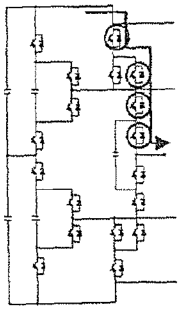
FIG. 21 are schematic views showing switching patterns of the basic cell.
Figure 21:
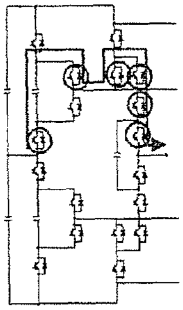
Figure 21:
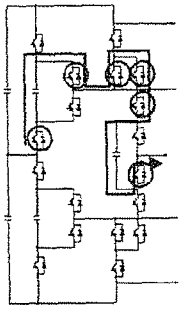
Figure 21:
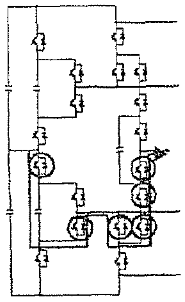
Figure 21:
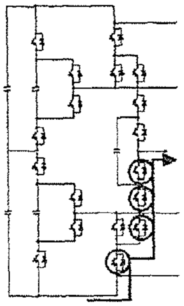

In this circuit configuration, by controlling the voltages of the direct current voltage sources DCC1 and DCC2 to 2E, controlling the voltage of the flying capacitors FC1 and FC2, and controlling the voltages of the flying capacitors FC1 and FC2, and the capacitors FC1*u*, FC1*v* and FC1*w* to E, it is possible to output the phase voltages of the 5 levels of 2E, E, 0, −E, and −2E. FIG. 21 shows a typical switching patterns of the U phase. ○ in the drawing represents the semiconductor element and the switching element which are conducted. By the path shown in FIG. 21, it is possible to output the phase voltages of 5 levels of 2E, E, 0, and −2E.

Figure 30:
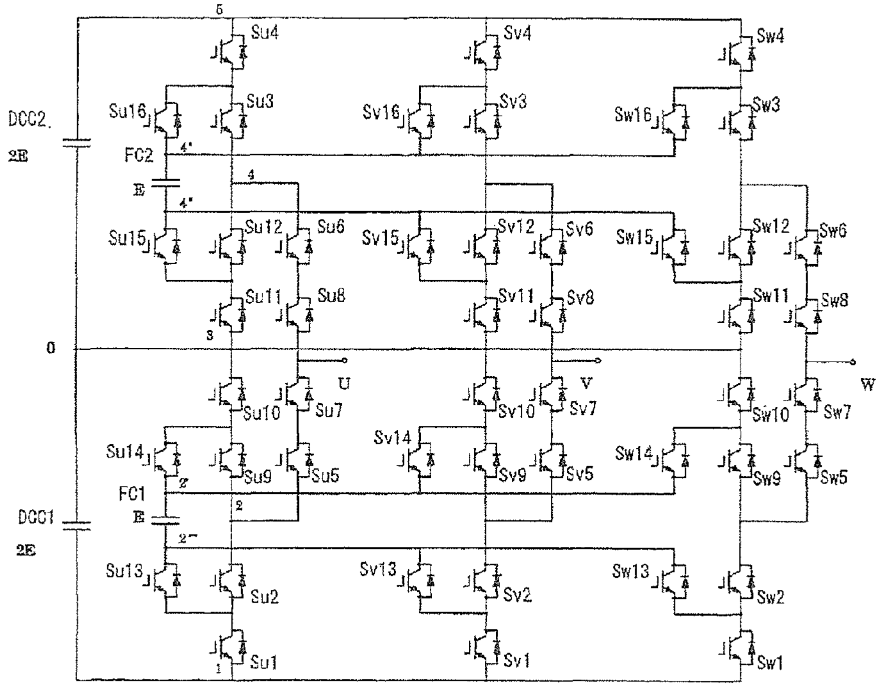
FIG. 30 is a circuit configuration view showing another example of a conventional multilevel power conversion device.

In this fourteenth embodiment, it is possible to decrease the number of the used switching elements (including the semiconductor elements Sf1*a* to Sf4*a*, and Sf1*b* to Sf4*b*) to 38. (The number of the switching elements of the conventional circuit of FIG. 30 is 48. The number of the switching elements of the conventional circuit of FIG. 30 is 44). Moreover, it is possible to omit the gate drive circuit for driving the switching elements. Accordingly, it is possible to attain the low cost.

Moreover, it is possible to ensure the freedom of the charge and the discharge, by limiting the voltage levels of the common connection points between the switching elements Sf3*a* and Sf4*a*, and Sf3*b* and Sf4*b* of the basic cells 10*a* and 10*b* to E, −E (the voltage reference point is the negative electrode terminals of the direct current voltage sources DCC1 to DCCN). Accordingly, it is possible to simplify the control.

Figure 31:
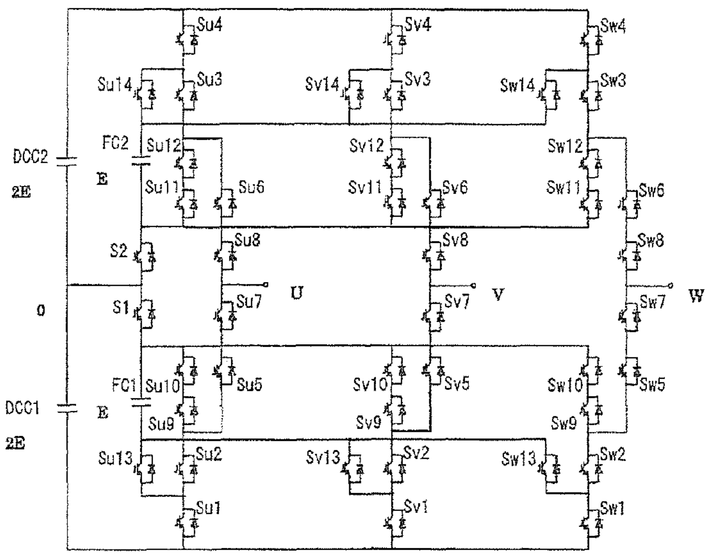
FIG. 31 is a circuit configuration view showing still another example of a conventional multilevel power conversion device.
Figure 32:
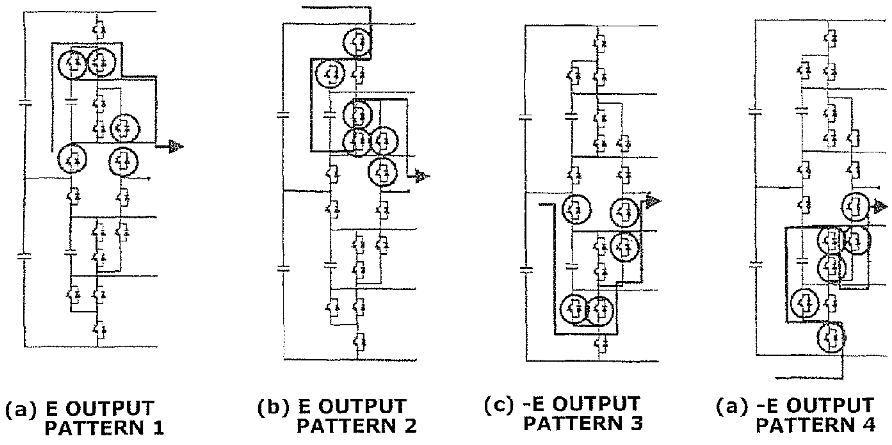
FIG. 32 are schematic views showing switching patterns of the output phase voltages E and −E of the conventional multilevel power conversion device.

The circuit of FIG. 31 of the conventional art has a combination of the switching pattern which the direct current voltage source DCC1 and the flying capacitor FC1, and the direct current voltage source DCC2 and the flying capacitor FC2 may be short-circuited. The fourth embodiment does not have the pattern which are short-circuited.

Figure 22:
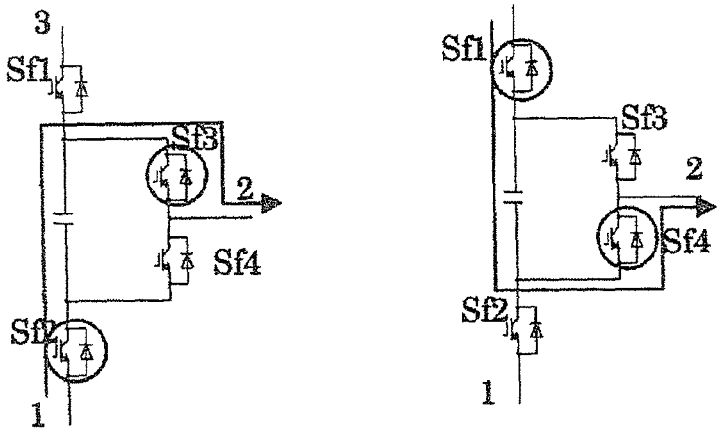
FIG. 22 are schematic views showing switching patterns at respective voltages of the multilevel power conversion device according to the fourteenth embodiment.

This is illustrated by using FIG. 22. ○ in the drawing shows the element which is conducted. The basic cells 10*a* and 10*b* which are common to the respective phases performs only the switching of two patterns shown in FIG. 22. Accordingly, even when any voltage levels are outputted, the semiconductor elements Sf1 and Sf2 are not simultaneously switched to the ON state. Accordingly, the short-circuit between the direct voltage source DCC2 and the flying capacitor FC2 is not generated. The connection patterns of the flying capacitors FC1 and FC2 can be switched. It is possible to charge and discharge by switching the current flowing into and out of the flying capacitors FC1 and FC2 by switching the connection patterns in accordance with the current. It is understood that the freedom of the charge and the discharge of the flying capacitors FC1 and FC2 is ensured.

Figure 23:
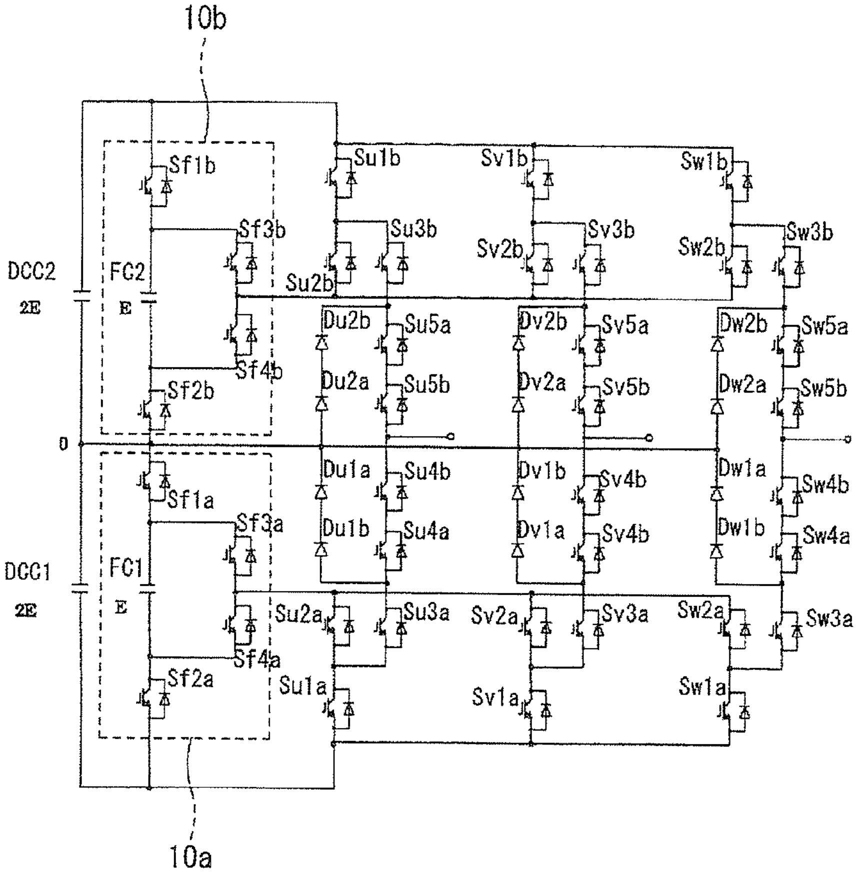
FIG. 23 is a circuit configuration view showing a multilevel power conversion device according to a fifteenth embodiment.

FIG. 23 shows a circuit configuration of a multilevel power conversion device according to fifteenth embodiment. Hereinafter, the circuit configuration of the multilevel power conversion device according to the fifteenth embodiment is illustrated based on FIG. 23. The multilevel power conversion device according to the fifteenth embodiment includes the direct current voltage sources DCC1 and DCC2 which are common to the respective phases, and the first and second basic cells 10*a* and 10*b*. By the phase modules provided to the respective phases, the voltage is selected, and outputted from the output terminals U, V, and W.

Hereinafter, a concrete circuit configuration of U phase is illustrated as an example. The connection between the direct current voltage sources DCC1 and DCC2 and the basic cells 10*a* and 10*b* is identical to that of the fourteenth embodiment.

The one end of the semiconductor element Sf2*a*, the common connection point between the semiconductor elements Sf3*a* and Sf4*a*, the common connection point between the semiconductor element Sf3*b* and Sf4*b*, the one end of the semiconductor element Sf1*b*, and the common connection point between the semiconductor elements Sf1*a* and Sf2*b* are connected to the phase modules of the respective phases as the input terminals.

In the phase module, the one end of the switching element Su1*a* is connected to the one end of the semiconductor element Sf2*a*, and the switching element Su1*b* is connected to the semiconductor element Sf1*b*. The one end of the switching element Su2*a* is connected to the common connection point between the semiconductor elements Sf3*a* and Sf4*a*. The switching element Su2*b* is connected to the common connection point between the semiconductor elements Sf3*b* and Sf4*b*.

The other ends of the switching elements Su1*a* and Su2*a* are connected with each other. The other ends of the switching elements Su1*b* and Su2*b* are connected with each other. The one ends of the switching elements Su3*a* and Su3*b* are connected with the common connection points between the switching elements Su1*a* and Su2*a*, and Su1*b* and Su2*b*.

The switching element Su4*a* is connected to the other end of the switching element Su3*a*. The other end of the switching element Su3*b* and the switching element Su5*a* are connected. In this case, the switching elements Su4*a*, Su4*b*, Su5*b*, Su5*a* are connected in series with each other so as to constitute the direct current circuit.

A cathode pf a diode Du1*a* and an anode of a diode Du2*a* are connected to the common connection point between the semiconductor element Sf1*a* and the semiconductor element Sf2*b*. The direct current circuit in which the switching elements Su4*a*, Su4*b*, Su5*b*, and Su5*a* are connected in series with each other are connected in parallel with the diode Du1*a* and the diode Du2*a*. Besides, the diode Du1*b* and Du2*b*, and the switching elements Su4*b* and Su5*b* are connected in series with the diode Du1*a* and Du2*a*, and the switching elements Su4*a* and Su5*a* for the withstanding voltage.

The common connection point between the switching elements between the switching elements Su4*b* and Su5*b* is set to the output terminal. By selectively controlling the respective switching elements in the ON-OFF manner, the potential of one of the input terminals is outputted from the output terminal.

Besides, the V phase and the W phase are similarly constituted.

Figure 24:
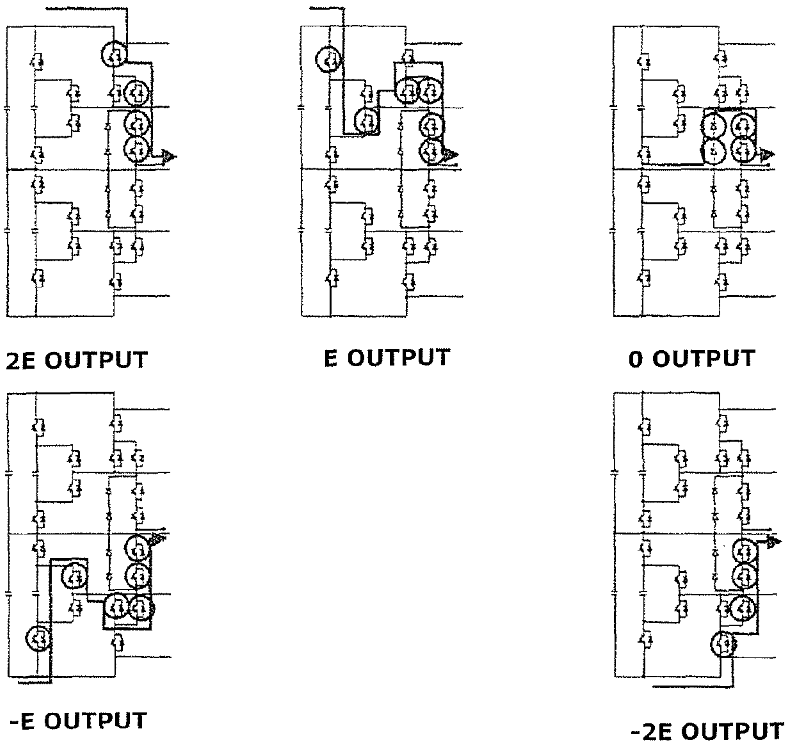
FIG. 24 are schematic views showing switching patterns at respective voltages of the multilevel power conversion device according to the fifteenth embodiment.

In this circuit configuration, by controlling the voltages of the direct current voltage sources DCC1 and DCC2 to 2E, and controlling the voltages of the flying capacitors FC1 and FC2 to E, it is possible to output the phase voltages of 5 levels of 2E, E, 0, −E, and −2E from the output terminals. FIG. 24 show typical switching patterns of the U phase. ○ in the drawing is the conducted semiconductor element, or the conducted switching element. By the path shown in FIG. 24, it is possible to output the phase voltage of 5 levels of 2E, E, 0, −E, and −2E.

In this fifteenth embodiment, it is possible to decrease the number of the used switching element (including the semiconductor elements) to 38. (The number of the switching elements of the conventional art of FIG. 30 is 48. The number of the switching elements of the conventional art of FIG. 31 is 44.) Moreover, it is possible to omit the gate drive circuit for driving the switching elements, and thereby to attain the lower cost.

By limiting the voltage levels outputted from the basic cells 10*a* and 10*b* to E and −E by using the basic cells 10*a* and 10*b*, it is possible to ensure the freedom of the charge and the discharge, and thereby to simplify the control.

Figure 33:
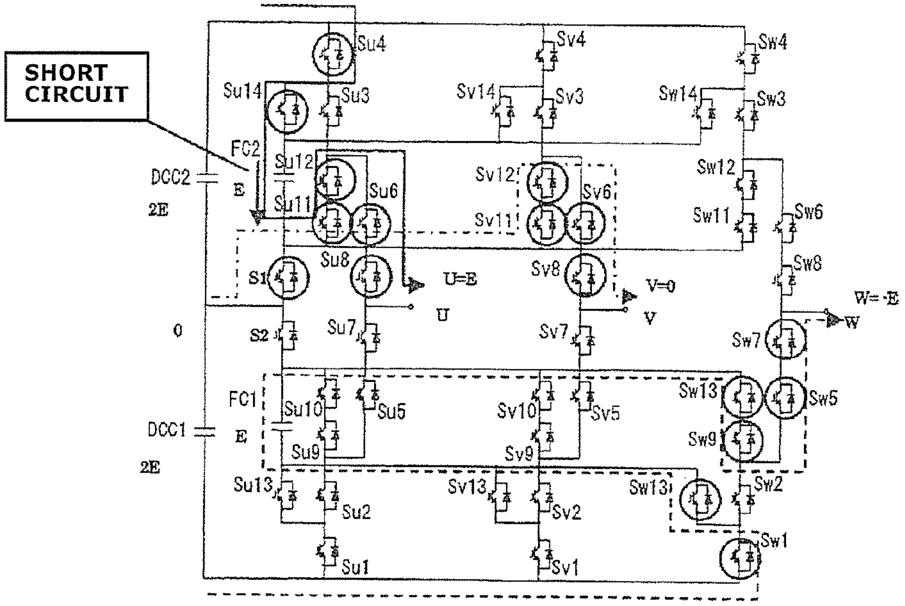
FIG. 33 is a schematic view showing a switching pattern which cannot be selected.

Moreover, the loss of the common portions relative to the circuit of FIG. 33 is decreased.

Sixteenth Embodiment

Figure 25:
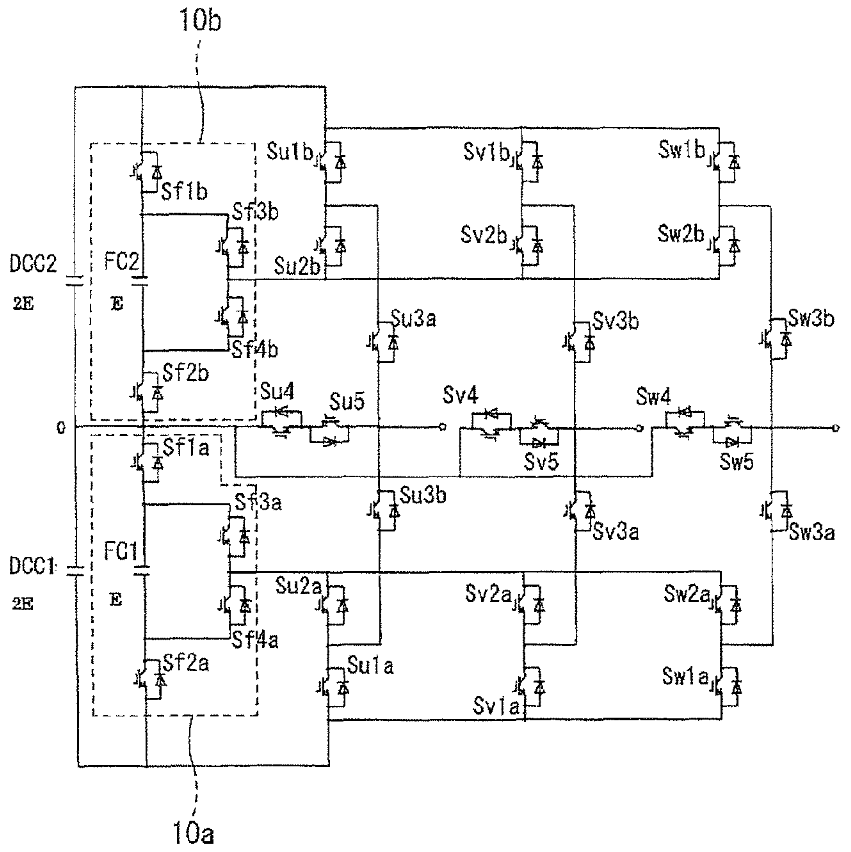
FIG. 25 is a circuit configuration view showing a multilevel power conversion device according to a sixteenth embodiment.

FIG. 25 shows a circuit configuration of a multilevel power conversion device according to a sixteenth embodiment. Hereinafter, the circuit configuration of the multilevel power conversion device according to the sixteenth embodiment is illustrated with reference to FIG. 25. The multilevel power conversion device according to the sixteenth embodiment includes the direct current power sources DCC1 and DCC2 which are common to the respective phases; and the first and second basic cells 10*a* and 10*b*. By the phase modules provided to the respective phases, the voltage is selected, and outputted from the output terminals U, V, and W.

Hereinafter, a concrete circuit configuration of U phase is illustrated as an example, The connections of the direct current voltage sources DCC1 and DCC2, and the basic cells 10*a* and 10*b* are identical to those of the fourteenth embodiment and the fifteenth embodiment.

The one end of the semiconductor element Sf2*a*, the common connection point between the semiconductor elements Sf3*a* and SF4*a*, the common connection point between the semiconductor elements Sf3*b* and Sf4*b*, the one end of the semiconductor element Sf1*b*, and the common connection point between the semiconductor elements Sf1*a* and Sf2*b* are connected to the phase modules of the respective phase modules as the input terminals.

In the phase module, the one end of the switching element Su1*a* is connected to the one end of the semiconductor element Sf2*a*, and the switching element Su1*b* is connected to the one end of the semiconductor element Sf1*b*. The one end of the switching element Su2*a* is connected to the common connection point between the semiconductor elements Sf3*a* and Sf4*a*. The switching element Su2*b* is connected to the common connection point between the semiconductor elements Sf3*b* and Sf4*b*.

The other ends of the switching elements Su1*a* and Su2*a*, and Su1*b* and Su2*b* are connected with each other. The one ends of the switching elements Su3*a* and Su3*b* are connected to the common connection points between the switching elements Su1*a* and Su2*a*, and Su1*b* and Su2*b*.

The one end of the bi-directional switch is connected to the common connection point between the semiconductor element Sf1*a* and the semiconductor element Sf2*b*. The other end of the bidirectional switch and the other ends of the switching elements Su4 and Su5*a* are connected. In this sixteenth embodiment, the switching elements Su4 and Su5 are inversely connected, so that the bidirectional switch is constituted. By setting the common connection point between the switching elements Su3*a* and Su3*b* and the bidirectional switch to the output terminal, and by selectively controlling the respective switching elements (including the semiconductor elements) in the ON-OFF manner, the potential of one of the input terminals is outputted from the output terminal.

Besides, the V phase and the W phase are similarly constituted.

Figure 26:
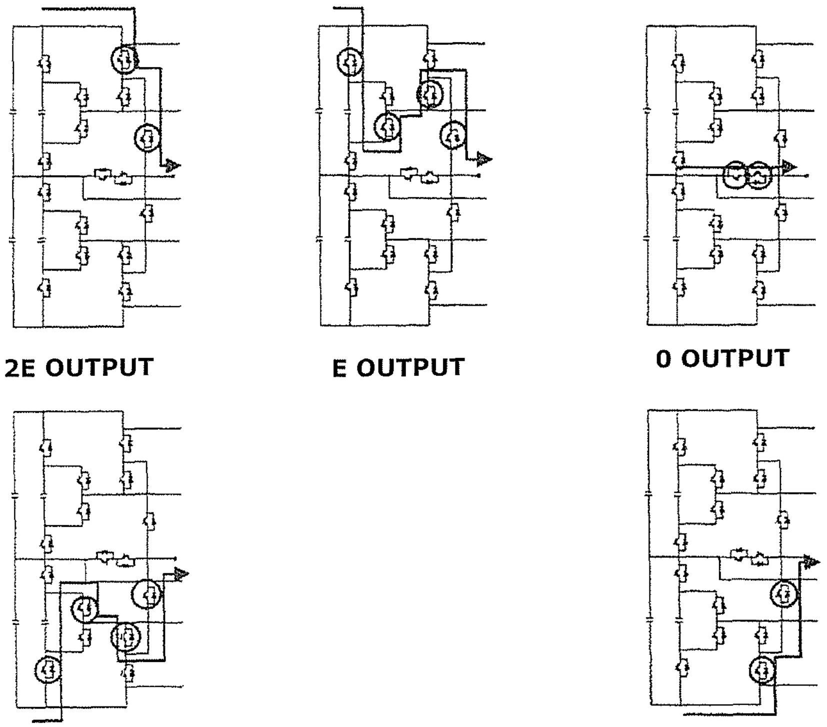
FIG. 26 are schematic views showing switching patterns at respective voltages of the multilevel power conversion device according to the sixteenth embodiment.

In this circuit configuration, by controlling the voltages of the direct current voltage sources DCC1 and DCC2 to 2E, and controlling the voltages of the flying capacitors FC1 and FC2 to E, it is possible to output the phase voltages of 5 levels of 2E, E, 0, −E, and −2E from the output terminals U, V, and W. FIG. 26 show typical switching patterns of the U phase. ○ in the drawing represents the conducted semiconductor element and the conducted switching element. By the path shown in FIG. 26, it is possible to output the phase voltage of 5 levels of 2E, E, 0, −E, and −2E.

In the sixteenth embodiment, it is possible to decrease the number of the used switching elements (including the semiconductor elements) to 32. Moreover, it is possible to omit the gate drive circuit for driving the switching elements, and thereby to decrease the cost.

By limiting the voltage levels outputted from the basic cells 10*a* and 10*b* to E and −E by using the basic cells 10*a* and 10*b*, it is possible to ensure the freedom of the charge and the discharge, and thereby to simplify the control.

Seventeenth Embodiment

Figure 27:
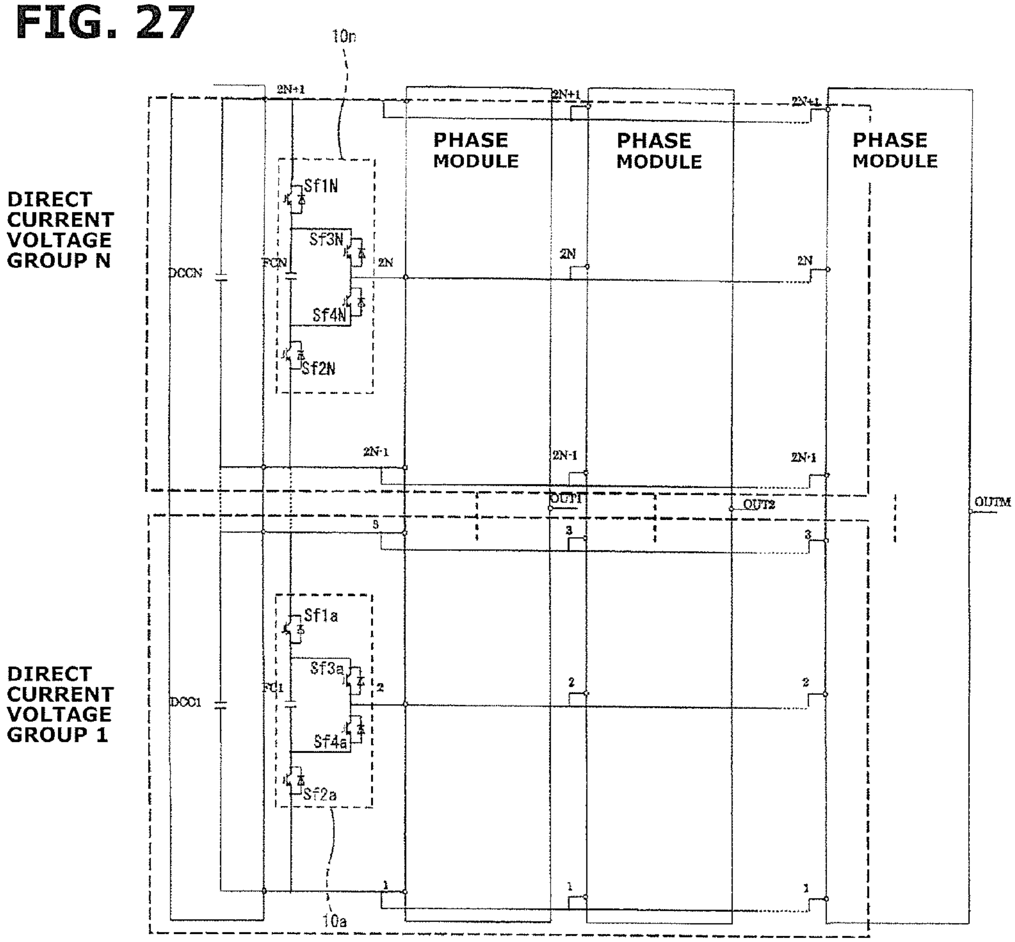
FIG. 27 is a block diagram showing a multilevel power conversion device according to the sixteenth embodiment.

FIG. 27 shows a circuit configuration of a multilevel power conversion device according to a seventeenth embodiment. In this circuit, the flying capacitors FC1 to FCN are common to the three phase.

N direct current voltage sources DCC1 to DCCN which are common to the respective phases are connected in series with each other. The multilevel power conversion device of FIG. 27 is constituted to the M phases and N stages by using the direct current power sources DCC1 to DCCN; a circuit which is formed by enlarging the basic cell of FIG. 18 to the N stages; and the phase modules of the M phase. Besides, N≥2, and M≥3 are set. Moreover, the first, fourth, fifteenth, and sixteenth embodiments are configurations in which N=2 and M=3 are set in the circuit of FIG. 27.

The one ends of the semiconductor elements Sf1*a* to Sf1*n* are connected to the positive electrode terminals of the direct current power sources DCC1 to DCCN. The one ends of the semiconductor elements Sf2*a* to Sf2*n* are connected to the negative electrode terminals of the direct current voltage sources DCC1 to DCCN. The configuration of the basic cells 10*a* to 10*n* are identical to those of the fourteenth embodiment.

The terminals 1, 2, 3, . . . , 2N−1, 2N, and 2N+1 are set to the input terminals of the phase modules. Besides, the terminal 3 and the terminal 2N−1 may not be necessarily connected to the respective phase modules. The fourteenth embodiment is an example in which the terminal 3 and the terminal 2N−1 of FIG. 27 are not connected to the phase modules.

In this case, by setting the voltages of the direct current voltage sources DCC1 to DCCN to 2E, and by controlling the voltages of the flying capacitors FC1 to FCN to E, it is possible to output the phase voltages of 2N+1 levels.

Figure 28:
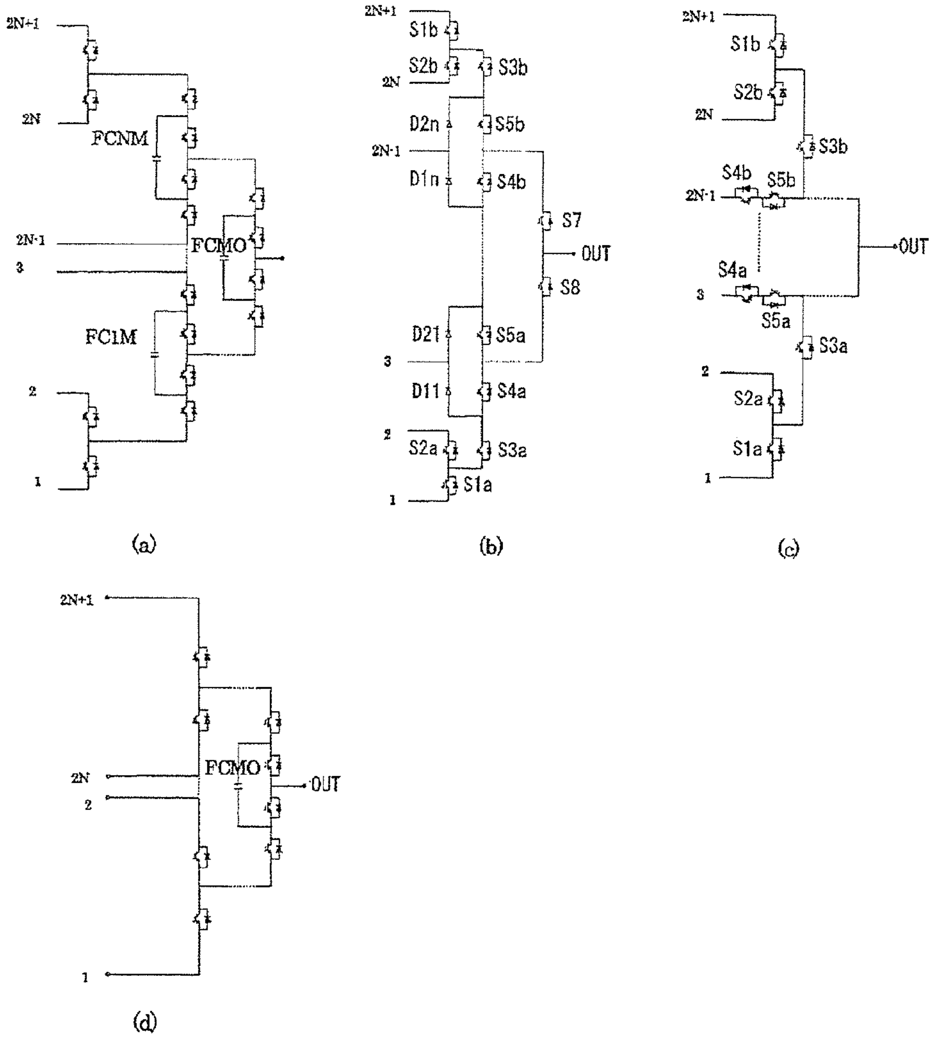
FIG. 28 are a schematic diagram showing a phase module.

FIG. 28 show examples of the phase modules. FIG. 28(*a*) is identical to FIG. 13(*c*). FIG. 28(*d*) is identical to FIG. 13(*d*).

In FIG. 28(*b*), the one ends of the switching elements S1*a*, S2*a*, S2*b*, and S1*b* are connected to the terminals 1, 2, 2N, and 2N+1. The other ends of the adjacent two switching elements S1*a* and S2*a* are connected to each other. The other ends of the adjacent two switching elements S2*b* and S1*b* are connected to each other. The one end of the switching element S3*a* is connected to the common connection point between the switching elements S1*a* and S2*a* whose the other ends are connected to each other. The one end of the switching element S3*b* is connected to the common connection point between the switching elements S2*b* and S1*b* whose the other ends are connected to each other.

The one end of the direct current circuit in which the switching element S4*a* and the switching element S5*a* are connected in series with each other is connected to the other end of the switching element S3*a*. The direct current circuit in which the switching element S4*b* and the switching element S5*b* are connected to each other is connected to the other end of the switching element S3*b*.

The cathodes of the diodes D11 and D1*n*, and the anodes of the diodes D21 and D2*n* are connected to the terminals 3 and 2N−1. The direct current circuit in which the switching elements S4*a* and S5*a* are connected in series with each other, and the direct current circuits in which S4*b* and S5*b* are connected in series with each other are connected in parallel with the diodes D11 and D21, and D1*n* and D2*n*. The one ends of the switching elements S8 and S7 are connected to the common connection point between the switching elements S4*a* and S5*a*, and the common connection point between the switching elements S4*b* and S5*b*. The other ends of the switching elements S7 and S8 are connected to each other. The common connection point between the switching elements S7 and S8 is set to the output terminal.

In the fifteenth embodiment, the terminal 3 and the terminal 2N−1 are set to one. The common connection point between the switching elements S4*b* and S5*b* is set to the output terminal U. For the withstand voltage, the diodes Du1*a* and Du1*b*, Du2*a* and Du2*b*, Su4*a* and Su4*b*, and Su5*a* and Su5*b* are connected in series with each other.

In FIG. 28(*c*), the one ends of the switching elements S1*a* and S1*b* are connected to the terminals 1 and 2N+1. The one ends of the switching elements S2*a* and S2*b* are connected to the terminals 2 and 2N. The other ends of the switching elements S1*a* and S2*a*, and S1*b* and S2*b* are connected to each other. The one ends of the switching elements 3*a* and 3*b* are connected to the common connection point between the switching elements S1*a* and S2*a*, and S1*b* and S2*b*.

The one end of the bidirectional switch is connected to the terminals 3 and 2N−1. The other end of the bidirectional switch and the other ends of the switching elements S3*a* and S3*b* are connected to each other. The common connection points between the switching elements S3*a* and S3*b*, and the bidirectional switch are set to the output terminals. Besides, in the sixteenth embodiment, the terminals 3 and 2N−1 are set to one.

The phase module has a function to select and connect one of the input terminals 1, 2, . . . , 2N+1 to the output terminal OUT by the ON/OFF operation of the switching elements within the phase module.

Moreover, as shown in FIG. 27, circuit groups from the direct current voltage sources DCC1 to DCCN to the inputs of phase modules of the respective phases (that is, the direct current voltage sources DCC1 to DCCN and the basic cells 10*a* to 10*n*) are represented as the direct current voltage groups 1 to N. In FIG. 27, the voltage levels inputted from one of the direct current voltage group 1 to N to the phase module are three levels of 0, E, and 2E. (the voltage reference point is the negative electrode terminal of the direct current voltage sources DCC1 to DCCN of the direct current voltage group.)

Moreover, the voltage level 2E of one of the direct current voltage group, and the voltage level 0 of the direct current voltage group which is upper stage by one from the one of the direct current voltage group become the same phase voltage when viewed from the output terminal of the phase module. In a structure in which there are N stages direct current voltage groups, as described above, the portions in which the voltage levels are superimposed with each other are (N−1) portions. Accordingly, in FIG. 27, it is possible to output the voltages of (3N−(N−1))=(2N+1) levels, to the output terminals OUT1 to OUTM.

The fourteenth embodiment is an example in which the phase module of FIG. 28(*d*) is used. The fifteenth embodiment is an example in which the phase module of FIG. 28(*b*) is used. The sixteenth embodiment is an example in which the phase module FIG. 28(*c*) is used. The direct current voltage sources in the fourteenth embodiment to the sixteenth embodiment are N=2. Accordingly, the number of the levels of the output voltages is 5 levels.

The invention claimed is:

1. A multilevel power conversion device configured to generate an alternating current output which is converted to a plurality of voltage levels from a direct current voltage, the multilevel power conversion device comprising:

N direct current voltage sources (N≥2) which are connected in series with each other, and which are common to respective phases;

a basic cell being common to the respective phases, and including a first semiconductor element having one end connected to positive electrode terminals of respective direct current voltage sources, a second semiconductor element having one end connected to negative electrode terminals of the respective direct current voltage sources, a flying capacitor connected between the other end of the first semiconductor element and the other end of the second semiconductor element, and third and fourth semiconductor elements connected in series between a common connection point of the first semiconductor element and the flying capacitor, and a common connection point of the second semiconductor element and the flying capacitor; and phase modules of M phases (M≥3), each including:

input terminals connected to at least one of the one end of the first semiconductor element and the one end of the second semiconductor element, and a common connection point of the third and fourth semiconductor elements;

an output terminal; and a plurality of switching elements which include first to fifth switching elements, and which are disposed between respective input terminals and the output terminal, each of the phase modules being configured to selectively control the respective first to fifth switching elements in an ON-OFF manner, wherein in each of the phase modules, one end of the first switching element is connected to one of the one end of the first semiconductor element or the one end of the second semiconductor element, one end of the second switching element is connected to the common connection point of the third and fourth semiconductor elements, the other ends of the first and second switching elements are connected to each other, one end of the third switching element is connected to a common connection point between the first and second switching elements, the other end of the third switching element is connected to one end of a direct current circuit in which the fourth switching element and the fifth switching element are connected in series with each other, a cathode of a first diode and an anode of a second diode are connected to the one end of the first semiconductor element or the one end of the second semiconductor element, the direct current circuit in which the fourth switching element and the fifth switching element are connected in series with each other is connected in parallel to the first diode and the second diode, a common connection point between the fourth and fifth switching elements is set to the output terminal, each of the phase modules is configured to output, at the output terminal, a potential of one of the input terminals, by selectively controlling the respective switching elements in an ON-OFF manner.

2. The multilevel power conversion device as claimed in claim 1, wherein the respective direct current voltage sources comprise two or more direct current connections.

3. The multilevel power conversion device as claimed in claim 1, wherein a part or all of the switching elements and the semiconductor elements comprise two or more direct current connections.

4. A multilevel power conversion device configured to generate an alternating current output which is converted to a plurality of voltage levels from a direct current voltage, the multilevel power conversion device comprising:

a first direct current voltage source which is common to respective phases;

a second direct current voltage source which is common to the respective phases, and which has a negative electrode terminal connected to a positive electrode terminal of the first direct current voltage source;

a first basic cell being common to the respective phases, and including a first semiconductor element having one end connected to the positive electrode terminal of the first direct current voltage source, a second semiconductor element having one end connected to a negative electrode terminal of the first direct current voltage source, a flying capacitor connected between the other end of the first semiconductor element and the other end of the second semiconductor element, and third and fourth semiconductor elements connected in order in series with each other between a common connection point of the first semiconductor element and the flying capacitor, and a common connection point between the second semiconductor element and the flying capacitor;

a second basic cell being common to the respective phases, and including a first semiconductor element having one end connected to a positive electrode terminal of the second direct current voltage source, a second semiconductor element having one end connected to the negative electrode terminal of the second direct current voltage source, a flying capacitor connected between the other end of the first semiconductor element and the other end of the second semiconductor element, and third and fourth semiconductor elements connected in order in series with each other between a common connection point between the first semiconductor element and the flying capacitor, and a common connection point between the second semiconductor element and the flying capacitor; and phase modules of M phases (M≥3), each including:

input terminals connected to the one end of the second semiconductor element of the first basic cell, a common connection point of the third and fourth semiconductor elements of the first basic cell, a common connection point between the first semiconductor element of the first basic cell and the second semiconductor element of the second basic cell, a common connection point of the third and fourth semiconductor elements of the second basic cell, and the one end of the first semiconductor element of the second basic cell;

first and second switching elements on a side of the second basic cell being connected in order in series with each other between the one end of the first semiconductor element of the second basic cell and the common connection point of the third and fourth semiconductor elements of the second basic cell;

first and second switching elements on a side of the first basic cell being connected in order in series with each other between the one end of the second semiconductor element of the first basic cell, and the common connection point of the third and fourth semiconductor elements of the first basic cell;

a third switching element on the side of the first basic cell, having one end connected to a common connection point of the first and second switching elements on the side of the first basic cell;

a third switching element on the side of the second basic cell, having one end connected to the common connection point of the first and second switching elements on the side of the second basic cell;

fifth and fourth switching elements being connected in order in series between the other end of the third switching element on the side of the second basic cell, and the other end of the third switching element on the side of the first basic cell;

a cathode of a first diode and an anode of a second diode being connected to the common connection point of the one end of the first semiconductor element of the first basic cell, and the one end of the second semiconductor element of the second basic cell;

a direct current circuit in which the fourth switching element and the fifth switching element are connected in series with each other being connected parallel to the first diode and the second diode; and an output terminal connected to a common connection point of the fourth and fifth switching elements, each of the phase modules of the M phases (M≥3) being configured to selectively control the respective switching elements in an ON-OFF manner, each of the phase modules being configured to output a potential of one of the input terminals at the output terminal by selectively controlling the respective switching elements in the ON-OFF manner.

5. The multilevel power conversion device as claimed in claim 4, wherein a part or all of the switching elements and the semiconductor elements comprise two or more direct current connections.

* * * * *